United States Patent
Wagenknecht et al.

(10) Patent No.: US 12,228,630 B2
(45) Date of Patent: Feb. 18, 2025

(54) PERIODIC PRIORITY BASED SCAN SCHEDULE

(71) Applicant: THE BOEING COMPANY, Chicago, IL (US)

(72) Inventors: Adam Wagenknecht, St. Louis, MO (US); John Joseph Keaveny, West Groves, MO (US)

(73) Assignee: THE BOEING COMPANY, Arlington, VA (US)

( * ) Notice: Subject to any disclaimer, the term of this patent is extended or adjusted under 35 U.S.C. 154(b) by 323 days.

(21) Appl. No.: 17/809,314

(22) Filed: Jun. 28, 2022

(65) Prior Publication Data
US 2023/0417856 A1    Dec. 28, 2023

(51) Int. Cl.
*G01S 1/56* (2006.01)
*G01S 1/04* (2006.01)

(52) U.S. Cl.
CPC ............ *G01S 1/56* (2013.01); *G01S 1/045* (2013.01)

(58) Field of Classification Search
CPC .................................. G01S 1/56; G01S 1/045
USPC ................................................... 342/408
See application file for complete search history.

(56) References Cited

U.S. PATENT DOCUMENTS

| | | | | |
|---|---|---|---|---|
| 11,747,438 B1 * | 9/2023 | Harrison | ................ | H01Q 1/28 |
| | | | | 342/16 |
| 2021/0279620 A1 * | 9/2021 | Frank | .................. | G06F 17/16 |

FOREIGN PATENT DOCUMENTS

| | | | |
|---|---|---|---|
| CN | 114545414 A | * 5/2022 | |
| WO | WO-2016010167 A1 | * 1/2016 | ............ H04B 1/713 |

OTHER PUBLICATIONS

Mir, Hasan et al., "Scheduling of Tasks With Fuzzy Dwell Times in a Multifunctional Radar," IEEE Xplore, downloaded on Mar. 14, 2022, pp. 1-6.
Mir, Hasan S. et al., "Variable Dwell Time Task Scheduling for Multifunctional Radar," IEEE Transactions of Automation Science and Egineering, vol. 11, No. 2, Apr. 2014, pp. 463-472.
Passino, Kevin M., " Design and Analysis of Stable Distributed Dynamic Scan Scheduling Policies," DARPA Autonomous Negotiating Teams (ANTS) Program Project Final Report to The Ohio State Univeristy, Jul. 3, 2002, pp. 1-58.
Vaughn, I. et al., "Optimal Periodic Sensor Scheduling in Electronic Support," 2005, retrieved from https://www.semanticscholar.org/paper/Optimal-Periodic-Sensor-Scheduling-in-Electronic-Clarkson/30ca4254d324ef3d64bdce65b80d048538c08bc3.
Wan, Tao et al., Radar Antenna Scan Pattern Intelligent Recognition Using Visibility Graph, IEEE Access, vol. 7, Dec. 18, 2019, pp. 175628-175641.

* cited by examiner

*Primary Examiner* — Harry K Liu
(74) *Attorney, Agent, or Firm* — Moore IP Law

(57) ABSTRACT

A device includes a controller configured to determine a first periodic priority function based on a first emitter signal periodicity of a first emitter type. The controller is also configured to determine a second periodic priority function based on a second emitter signal periodicity of a second emitter type. The controller is further configured to generate a scan schedule of a receiver system based on at least the first periodic priority function and the second periodic priority function.

20 Claims, 12 Drawing Sheets

PERIODIC PRIORITY BASED SCAN SCHEDULE

FIELD OF THE DISCLOSURE

The present disclosure is generally related to generating a scan schedule for emitter detection.

BACKGROUND

Radar systems can be used to scan various frequency ranges to detect emitters. Pulses from some types of emitters are periodically detectable by a receiver. For example, a pulse from a rotating emitter can be detected when the pulse is transmitted while the emitter is directed towards the receiver. However, pulses generated while the emitter is rotated away from the receiver may generally not be detectable by the receiver. An attempt by the receiver to detect the emitter by scanning a frequency band used by the emitter can therefore fail if the scan occurs during a period when the emitter is not transmitting, or when the emitter is transmitting pulses in a direction away from the receiver. Scanning for the emitter during such a period also uses resources that could have been used to scan for other emitters that could be detectable by the receiver.

SUMMARY

In a particular implementation, a device includes a controller configured to determine a first periodic priority function based on a first emitter signal periodicity of a first emitter type. The controller is also configured to determine a second periodic priority function based on a second emitter signal periodicity of a second emitter type. The controller is further configured to generate a scan schedule of a receiver system based on at least the first periodic priority function and the second periodic priority function.

In another particular implementation, a method includes determining, at a device, a first periodic priority function based on a first emitter signal periodicity of a first emitter type. The method also includes determining, at the device, a second periodic priority function based on a second emitter signal periodicity of a second emitter type. The method further includes generating, at the device, a scan schedule based on at least the first periodic priority function and the second periodic priority function. The scan schedule includes a time sequence of scan slots. The method also includes performing, at the device, a scan of a first frequency range during a particular scan slot of the scan schedule, the first frequency range associated with the first emitter type.

In another particular implementation, a non-transitory computer-readable medium stores instructions that, when executed by one or more processors, cause the one or more processors to determine a first periodic priority function based on a first emitter signal periodicity of a first emitter type. The instructions, when executed by the one or more processors, also cause the one or more processors to determine a second periodic priority function based on a second emitter signal periodicity of a second emitter type. The instructions, when executed by the one or more processors, further cause the one or more processors to generate a scan schedule based on at least the first periodic priority function and the second periodic priority function. The scan schedule includes a time sequence of scan slots. The instructions, when executed by the one or more processors, also cause the one or more processors to initiate a scan of a first frequency range during a particular scan slot of the scan schedule. The first frequency range is associated with the first emitter type.

The features, functions, and advantages described herein can be achieved independently in various implementations or may be combined in yet other implementations, further details of which can be found with reference to the following description and drawings.

DETAILED DESCRIPTION

Figure 1:
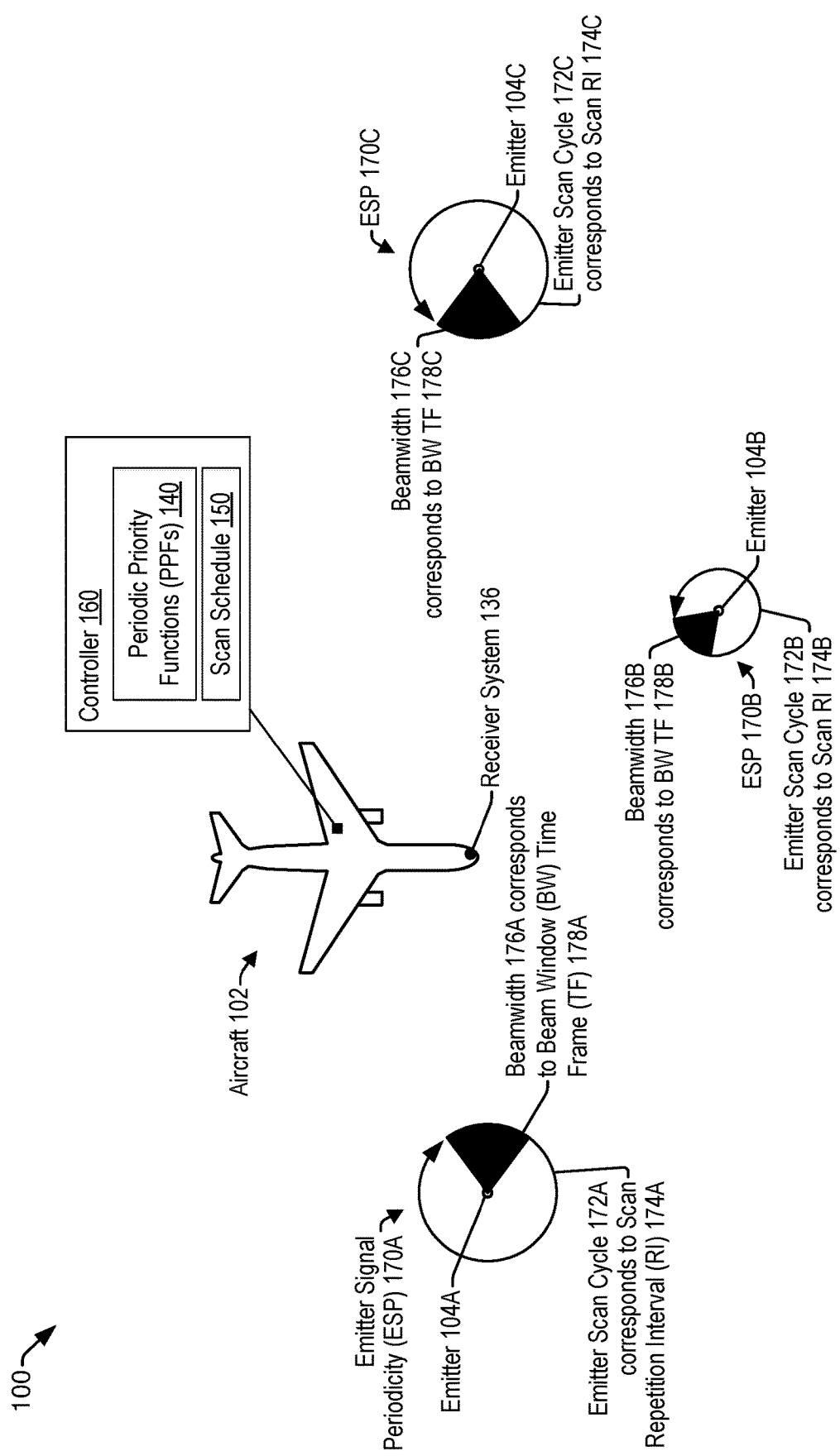
FIG. 1 is a diagram that illustrates a system configured to generate a scan schedule based on periodic priority.

Aspects disclosed herein present systems and methods for generating a scan schedule based on periodic priority. Pulses from some types of emitters are received periodically by a receiver. For example, a pulse from a rotating emitter can be received when the emitter is directing the pulse towards the receiver and may not be received when the emitter is rotated away from the receiver. As another example, an oscillating emitter generates an oscillating pulse signal that may be considered "directed towards" the receiver when the pulse signal is above an energy threshold that is detectable by the receiver. A scan of a frequency range of the emitter when the emitter is not directing pulses towards the receiver can cause the receiver to fail to detect the emitter.

According to an aspect, a particular emitter has an emitter signal periodicity that is based on a scan repetition interval and a beam window time frame that are associated with a particular type of emitter. In an example, the particular emitter is detectable by the receiver during the beam window time frame (e.g., 83 milliseconds (ms)) repeated once per scan repetition interval (e.g., 10 seconds). A controller associated with the receiver determines a particular periodic priority function based at least in part on the emitter signal periodicity. For example, if the particular emitter has not yet been detected by the receiver (referred to herein as a "previously undetected" emitter), the controller generates the periodic priority function having a higher priority once every beam window time frame (e.g., higher priority every 83 ms) to scan for emitters of that particular type. To illustrate, when the emitter is previously undetected, scanning at least once every beam window time frame increases a probability of the receiver intercepting a pulse from the particular emitter whenever the next beam window occurs. For a previously undetected emitter, the probability of intercepting a subsequent pulse from the particular emitter is increased when the scans are scheduled based on the beam window time frame (e.g., at least once every 83 ms).

Once a pulse from the particular emitter is detected, the particular emitter is referred to as "previously detected," and the controller updates the periodic priority function for the emitter to have a higher priority once every scan repetition interval (e.g., higher priority every 10 seconds) from a previous detection time (e.g., time $t_{d1}$) of a previous pulse from the particular emitter. To illustrate, when the previous pulse is received during a previous beam window, the controller can predict that a subsequent pulse is likely to be detectable during a next beam window at a scan time that is a scan repetition interval from the previous detection time (e.g., 10 seconds after $t_{d1}$). For a previously detected emitter, the probability of intercepting a subsequent pulse from the particular emitter can remain high with less frequent scans (e.g., at least once every 10 seconds instead of every 83 ms) when the scans are scheduled based on the scan repetition interval.

The controller generates the scan schedule based on the particular periodic priority function, based on one or more additional periodic priority functions associated with one or more additional emitters, or a combination thereof. The scan schedule may indicate, for each time period within the schedule, which frequency range(s) are to be scanned during that time period. Because the controller is unlikely to have sufficient resources (e.g., antennas and receivers) for continuous tracking of previously detected emitters, continuous scanning for all suspected but currently undetected emitters, and continuous scanning for unknown emitters, the controller assigns priorities to specific scanning tasks and allocates scanning resources based on relative priorities. Allocation of scanning resources for each time slice of the scanning schedule is determined based on which task has the highest priority during that time slice. By using periodic priority functions to determine a time-varying priority for emitters based on the periodic behavior of the emitters, the controller can raise an emitter's scan priority during times when the emitter is most likely to be detected and lower that emitter's scan priority when the emitter is less likely to be detected, enabling a more efficient use of scanning resources than in conventional systems.

The controller thus balances increasing a probability of intercepting a pulse from a particular emitter with reducing the frequency of scans for the particular emitter. Performing fewer scans for any particular emitter enables more scanning for other emitters. Two emitter states (e.g., previously undetected and previously detected) are provided as an illustrative example. In other examples, there can be more than two emitter states and the controller can generate a periodic priority function corresponding to an assigned emitter state, as described further below.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple emitters are illustrated and associated with reference numbers 104A, 104B, and 104C. When referring to a particular one of these emitters, such as the emitter 104A, the distinguishing letter "A" is used. However, when referring to any arbitrary one of these emitters or to these emitters as a group, the reference number 104 is used without a distinguishing letter.

Figure 2:
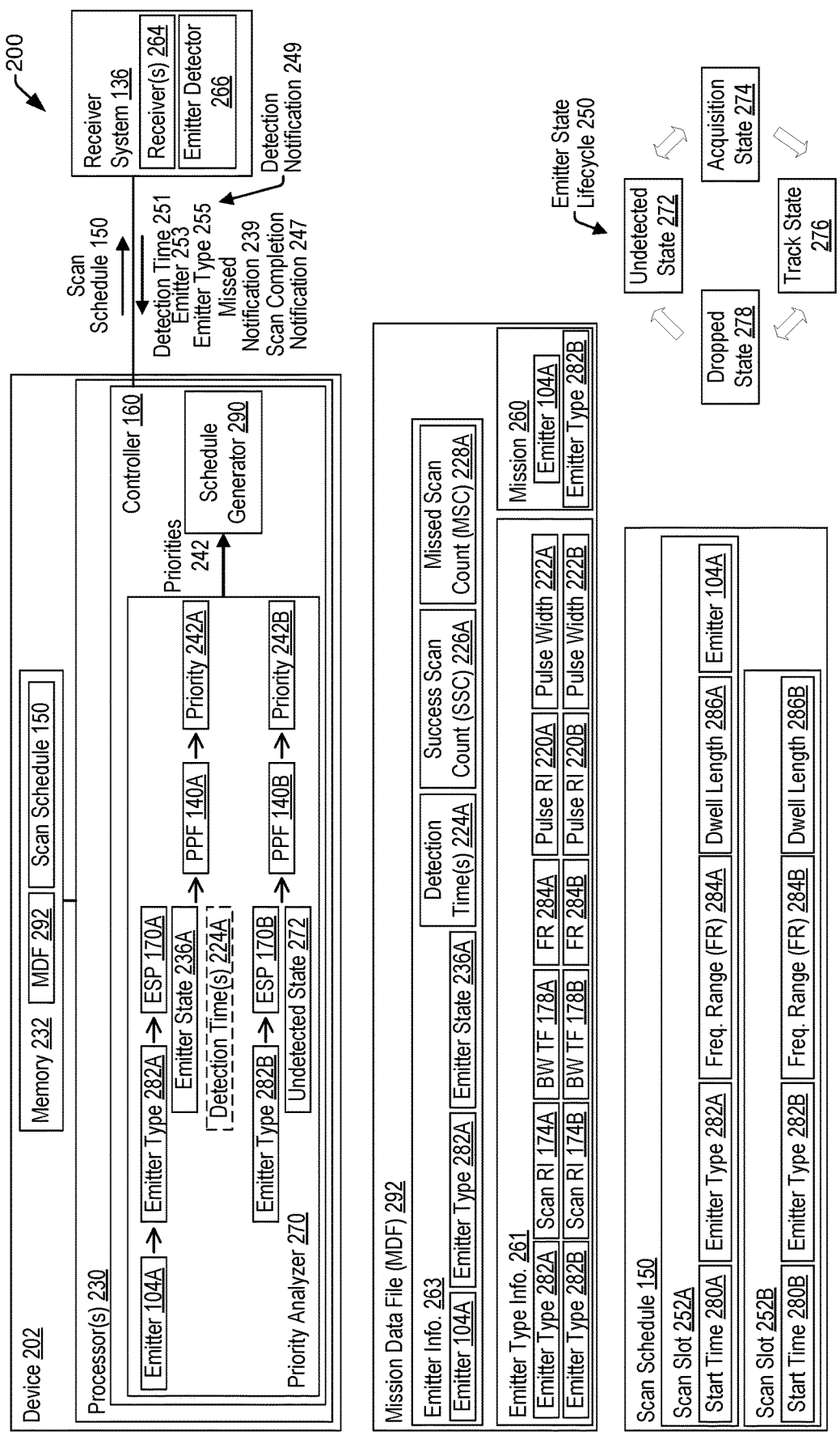
FIG. 2 is a diagram of a particular implementation of a device coupled to a receiver system and an example of an emitter state lifecycle of the system of FIG. 1.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 2 depicts a device 202 including one or more processors ("processor(s)" 230 in FIG. 2), which indicates that in some implementations the device 202 includes a single processor 230 and in other implementations the device 202 includes multiple processors 230. For ease of reference herein, such features are generally introduced as "one or more" features, and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to generate a scan schedule based on periodic priority. The system 100 includes an aircraft 102 that includes a receiver system 136 and a controller 160.

The receiver system 136 includes one or more receivers that are configured to detect pulses from one or more emitters 104, such as an emitter 104A, an emitter 104B, an emitter 104C, one or more additional emitters, or a combination thereof. For example, a particular receiver of the receiver system 136 is configured to detect a pulse from the emitter 104A when the emitter 104A is within range of the particular receiver, the particular receiver is scanning a particular frequency range of the emitter 104A, and the emitter 104A is emitting a pulse directed towards the particular receiver. In a particular aspect, the one or more emitters 104 include a stationary radar, a mobile radar, an aircraft beacon, a civilian radio transmitter, a military radio transmitter, or a combination thereof.

In FIG. 1, the emitter 104A, the emitter 104B, and the emitter 104C are described as rotating emitters as an illustrative example. In other examples, one or more emitters can be of various types (e.g., oscillating emitters) with signal periodicity. An emitter signal periodicity of an emitter is characterized by an emitter scan cycle and a beamwidth of the emitter. For a rotating emitter, the emitter scan cycle corresponds to a complete rotation of the emitter. To illustrate, the emitter 104A has an emitter scan cycle 172A that corresponds to a complete rotation of the emitter 104A. For an oscillating emitter, the emitter scan cycle corresponds to completion of an oscillation cycle. A "scan repetition interval" indicates a time taken for an emitter to complete an emitter scan cycle. For example, a scan repetition interval 174A (e.g., 10 seconds) of the emitter 104A indicates a time taken for the emitter 104A to complete the emitter scan cycle 172A (e.g., a rotation or an oscillation cycle). Similarly, the emitter 104B has an emitter scan cycle 172B and a corresponding scan repetition interval 174B, and the emitter 104C has an emitter scan cycle 172C and a corresponding scan repetition interval 174C.

A beamwidth of a rotating emitter indicates an angular distance between half power points that define a beam window of the emitter. For example, the emitter 104A has a beamwidth 176A (e.g., 3 degrees) (elements in the figures are not necessarily drawn to scale). A "beam window time frame" indicates a duration of the beam window in each emitter scan cycle. A beam window (BW) time frame is based on a beamwidth and a scan repetition interval (e.g., BW time frame=(beamwidth/360 degrees)*scan repetition interval). For example, a beam window time frame 178A of the emitter 104A is based on the beamwidth 176A and the scan repetition interval 174A (e.g., (3/360)*10 secs=83 ms). Similarly, the emitter 104B has a beamwidth 176B and a beam window time frame 178B, and the emitter 104C has a beamwidth 176C and a beam window time frame 178C.

The emitter 104A has an emitter signal periodicity 170A corresponding to the scan repetition interval 174A and the beam window time frame 178A. For example, when the emitter 104A is within range of the receiver system 136, a pulse from the emitter 104A is detectable by the receiver system 136 during the beam window time frame 178A (e.g., 83 ms) of a beam window repeated once for each of the scan repetition interval 174A (e.g., every 10 seconds). Similarly, the emitter 104B has an emitter signal periodicity 170B corresponding to the scan repetition interval 174B and the beam window time frame 178B, and the emitter 104C has an emitter signal periodicity 170C corresponding to the scan repetition interval 174C and the beam window time frame 178C.

The controller 160 is configured to determine periodic priority functions (PPFs) 140 associated with one or more emitters and to generate a scan schedule 150 based on the periodic priority functions 140, as further described with reference to FIGS. 2-4. For example, the controller 160, in response to determining that the periodic priority functions 140 indicate that the emitter 104A has a higher priority than other emitters at a start time of a scan slot of the scan schedule 150, assigns the scan slot for scanning a frequency range of the emitter 104A.

The controller 160 is coupled via one or more networks to the receiver system 136. Although the controller 160 and the receiver system 136 are illustrated as separated from each other and included in or coupled to the aircraft 102, in other implementations the controller 160 and the receiver system 136 can be co-located or geographically distributed from each other. In a particular example, the controller 160 can be integrated in a ground control device that receives detection data from the receiver system 136 of the aircraft 102 and provides the scan schedule 150 to the receiver system 136. The receiver system 136 is configured to operate in accordance with the scan schedule 150.

Although FIG. 1 depicts the aircraft 102 as an airplane, in other implementations the controller 160, the receiver system 136, or both, can be integrated in another type of aircraft (e.g., an unmanned aerial vehicle (UAV)), another type of vehicle (e.g., a car, a boat, a ship, etc.), or another type of device.

Although the receiver system 136 and the controller 160 are depicted as separate components, in other implementations the described functionality of the receiver system 136 and the controller 160 can be performed by a single component. In some implementations, each of the receiver system 136 and the controller 160 can be represented in hardware, such as via an application-specific integrated circuit (ASIC) or a field-programmable gate array (FPGA), or the operations described with reference to the elements may be performed by a processor executing computer-readable instructions.

Although FIG. 1 illustrates particular examples for clarity of explanation, such examples are not to be considered as limitations. For example, although the system 100 is described as including the emitter 104A, the emitter 104B, and the emitter 104C, in other examples the system 100 includes one or more other emitters, in addition to, or instead of, the emitter 104A, the emitter 104B, and the emitter 104C, such as one or more oscillating emitters. In some examples, one or more emitters may move into or out of range of the receiver system 136 due to movement of the aircraft 102, movement of the one or more emitters, or a combination thereof.

Figure 3:
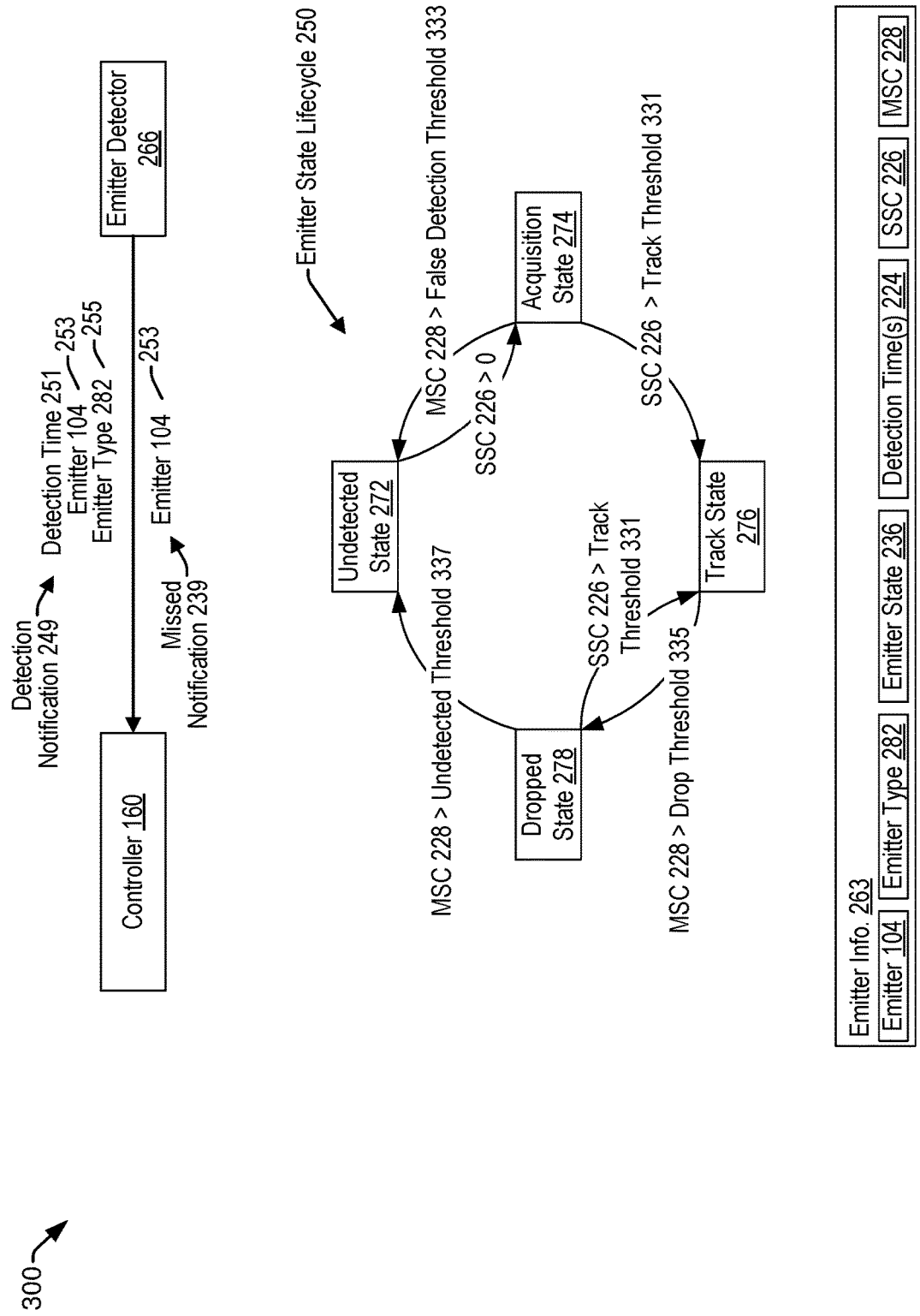
FIG. 3 is a diagram that illustrates an example of updating an emitter state that is used by the system of FIG. 1.
Figure 4A:
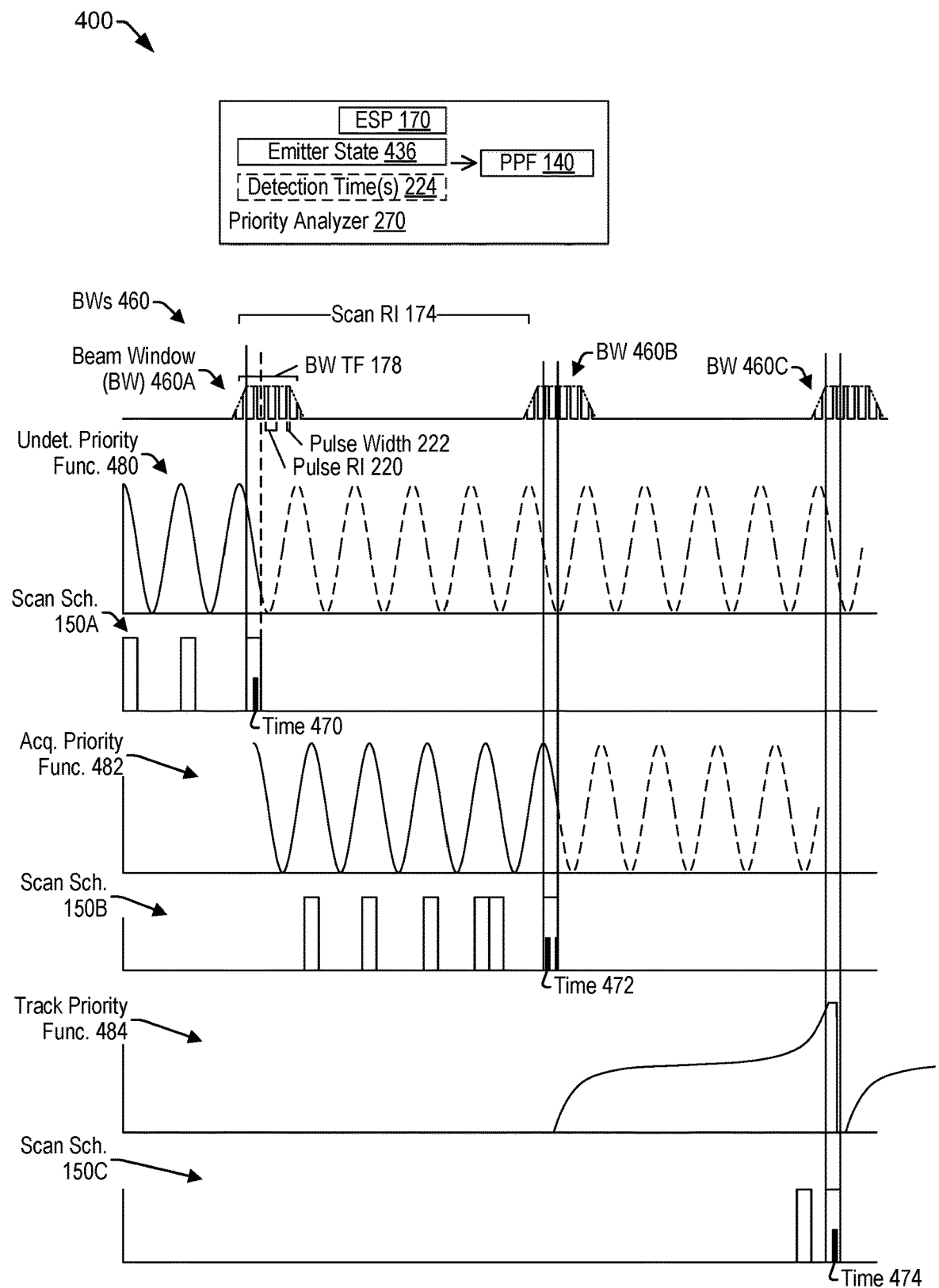
FIG. 4A is a diagram that illustrates an example of priority functions and corresponding scan schedules generated by the system of FIG. 1.
Figure 4B:
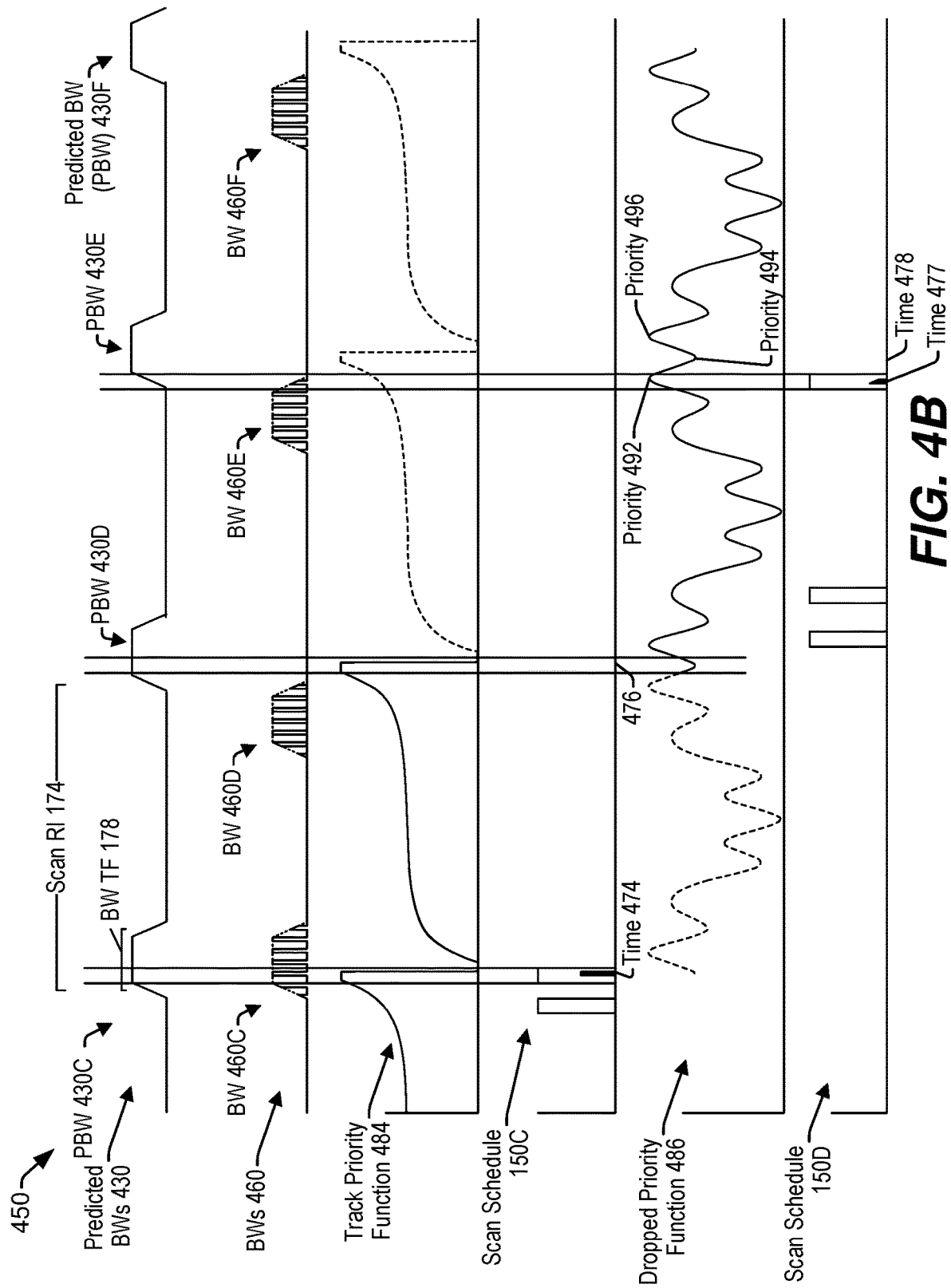
FIG. 4B is a diagram that illustrates another example of priority functions and corresponding scan schedules generated by the system of FIG. 1.

FIGS. 2-4B illustrate generation of a scan schedule based on periodic priority. FIG. 2 illustrates an implementation of a device that is operable to generate the scan schedule based on periodic priority. FIG. 3 illustrates an example of updating an emitter state. FIGS. 4A-4B illustrate examples of priority functions corresponding to various emitter states. The priority functions are used by the device of FIG. 2 to generate the scan schedule.

Referring to FIG. 2, a diagram 200 illustrates an implementation of a device 202 that is operable to generate a scan schedule based on periodic priority. The diagram 200 also includes an example of an emitter state lifecycle 250 used by the system 100 of FIG. 1, the device 202, or both. In a particular aspect, the device 202 corresponds to, or is integrated in, the aircraft 102 of FIG. 1.

The device 202 includes one or more processors 230 coupled to a memory 232. The one or more processors 230 can be implemented as a single processor or as multiple processors, such as in a multi-core configuration, a multi-processor configuration, a distributed computing configuration, a cloud computing configuration, or any combination thereof. In some implementations, one or more portions of the controller 160 are implemented by the one or more processors 230 using dedicated hardware, firmware, or a combination thereof. In some implementations, one or more portions of the controller 160 can be implemented at least in part by the one or more processors 230 executing instructions.

The memory 232 is configured to store a mission data file (MDF) 292 that indicates a mission 260 of the controller 160. In an example, the mission 260 includes scanning for an emitter 104A and scanning for any emitter of an emitter type 282B. In some aspects, the MDF 292 also indicates emitter type information 261 of various emitter types, such as an emitter type 282A, the emitter type 282B, one or more additional emitter types, or a combination thereof. In some aspects, the MDF 292 indicates emitter information 263 of the emitter 104A, one or more additional emitters, or a combination thereof.

The one or more processors 230 include the controller 160. The controller 160 is configured to be coupled to the receiver system 136 and includes a priority analyzer 270 coupled to a schedule generator 290. The priority analyzer 270 is configured to generate priorities 242 associated with scanning for specific emitters, scanning for any emitters of particular emitter types, or a combination thereof, at a specific scan start time. The schedule generator 290 is configured to generate (or update) a scan schedule 150 based on the priorities 242. For example, the schedule generator 290 is configured to designate a scan slot associated with the specific scan start time for scanning the specific emitter or emitters of a particular emitter type that corresponds to the highest priority of the priorities 242. The priority analyzer 270 and the schedule generator 290 are configured to iteratively determine the priorities 242 and designate scan slots 252, respectively, until the scan schedule 150 is filled (e.g., any remaining portion of the scan schedule 150 is less than a minimum scan slot duration).

The schedule generator 290 is configured to provide the scan schedule 150 to the receiver system 136. In the illustrated example, the receiver system 136 includes one or more receivers 264 and an emitter detector 266. It should be understood that the one or more receivers 264 are shown as external to the device 202 for ease of illustration. In some examples, the one or more receivers 264 can be at least partially integrated in the device 202. The one or more receivers 264 can be co-located or located at various distances from each other. In a particular aspect, the one or more receivers 264 correspond to a receiver array. The receiver system 136 is configured to operate in accordance with the scan schedule 150. For example, the receiver system 136 uses the one or more receivers 264 to initiate scanning of frequency ranges indicated by the scan schedule 150 at corresponding scan start times.

The emitter detector 266 is configured to, in response to at least one of the one or more receivers 264 receiving a pulse from an emitter, generate a detection notification 249 indicating that the pulse is detected at a detection time 251, that the pulse is received from an emitter 253, that the emitter 253 is of an emitter type 255, or a combination thereof. The emitter detector 266 is configured to provide the detection notification 249 to the controller 160. In some aspects, the controller 160 is configured to update the emitter type information 261, the emitter information 263, or both, based on the detection notification 249 received from the emitter detector 266.

In some aspects, the emitter detector 266 is configured to, in response to performing a scan for a particular emitter associated with a scan slot of the scan schedule 150 and determining that no pulse is received during the scan, generate a missed notification 239 indicating an unsuccessful scan for the particular emitter and provide the missed notification 239 to the controller 160. In some implementations, the receiver system 136, in response to determining that scanning corresponding to all scan slots of the scan schedule 150 has been completed, sends a scan completion notification 247 to the controller 160. In some aspects, the controller 160 is configured to update the emitter information 263 based on the missed notification 239, the scan completion notification 247, or both.

According to an aspect, an emitter type has an associated emitter signal periodicity that is characterized by a scan repetition interval and a beamwidth. In an example, the emitter 104A is of the emitter type 282A. Any emitter (including the emitter 104A or another emitter) of the emitter type 282A has the emitter signal periodicity 170A, which is characterized by the scan repetition interval 174A (e.g., 10 seconds) and the beamwidth 176A (e.g., 3 degrees), as described with reference to FIG. 1. Similarly, any emitter of the emitter type 282B has the emitter signal periodicity 170B, which is characterized by the scan repetition interval 174B and the beamwidth 176B, as described with reference to FIG. 1.

In a particular aspect, the emitter type information 261 indicates that the emitter type 282A has the scan repetition interval 174A and the beam window (BW) time frame (TF) 178A. In some implementations, the emitter type information 261 indicates the beamwidth 176A of the emitter type 282A. In these implementations, the controller 160 can determine the beam window time frame 178A based on the beamwidth 176A and the scan repetition interval 174A, as described with reference to FIG. 1. In a particular aspect, the emitter type information 261 indicates that the emitter type 282A has the frequency range 284A. For example, any emitter of the emitter type 282A emits pulses in the frequency range 284A. In a particular aspect, the emitter type information 261 indicates that the emitter type 282A has a pulse repetition interval (RI) 220A and a pulse width 222A. The pulse repetition interval 220A indicates an elapsed time between leading edges of a pair of consecutive pulses from an emitter of the emitter type 282A. The pulse width 222A indicates an elapsed time between a leading edge and a trailing edge of a single pulse from an emitter of the emitter type 282A.

Similarly, the emitter type information 261 indicates that the emitter type 282B has the scan repetition interval 174B, the beam window time frame 178B, a frequency range 284B, a pulse repetition interval 220B, a pulse width 222B, or a combination thereof. In some examples, the emitter type information 261 indicates the beamwidth 176B of the emitter type 282B. In these examples, the controller 160 determines the beam window time frame 178B based on the beamwidth 176B and the scan repetition interval 174B, as described with reference to FIG. 1.

In a particular aspect, the emitter information 263 indicates that the emitter 104A is of the emitter type 282A. In a particular aspect, the emitter information 263 indicates an emitter state 236A of the emitter 104A. For example, the emitter state 236A is one of the emitter states (e.g., an undetected state 272, an acquisition state 274, a track state 276, or a dropped state 278) indicated by the emitter state lifecycle 250, as described herein. In some implementations, the controller 160 initializes the emitter state 236A to the undetected state 272 to indicate that no pulses have been detected from the emitter 104A.

In some implementations, the controller 160 is configured to track a success scan count (SSC) 226 indicating a count of successful scans, a missed scan count (MSC) 228 indicating a second count of unsuccessful scans, or both, per emitter 104 that is included in the mission 260. For example, the controller 160 is configured to track an SSC 226A, a MSC 228A, or both, of the emitter 104A.

The SSC 226 indicates a count of consecutive successful scans during which at least one pulse from an emitter 104 is detected. The MSC 228 indicates a count of consecutive unsuccessful scan intervals during which no pulse is detected from the emitter 104. In a particular aspect, the controller 160 determines that a particular scan interval associated with the scan schedule 150 begins at a start time 280A of an initial scan slot (e.g., a scan slot 252A) of the scan schedule 150 and ends at a time that the scan completion notification 247 is received from the receiver system 136. Thus, multiple successful scans can be counted for a particular scan interval if multiple pulses are received from an emitter 104 during the particular scan interval. Alternatively, a single unsuccessful scan is counted for the particular scan interval if no pulses are detected from the emitter 104 during the particular scan interval.

The controller 160 is configured to, responsive to receiving the detection notification 249, update the SSC 226 (e.g., increment by 1) and the MSC 228 (e.g., set to 0) corresponding to the detected emitter 104 (e.g., the emitter 253 indicated by the detection notification 249). The controller 160 is also configured to update the SSC 226 (e.g., set to 0) and the MSC 228 (e.g., increment by 1) corresponding to the emitter 104 in response to receiving at least one missed notification 239 indicating the emitter 104 and determining that no detection notification 249 indicating the emitter 104 is received during the particular scan interval. In some aspects, the controller 160 is configured to update an emitter state 236 of the emitter 104 based on the SSC 226, the MSC 228, and one or more thresholds, as further described with reference to FIG. 3. For example, the controller 160 is configured to update the emitter state 236A based on the SSC 226A, the MSC 228A, or both.

In some implementations, the controller 160 is configured to maintain a record of one or more detection times of pulses from a particular emitter. For example, the controller 160 is configured to, in response to receiving the detection notification 249, store the detection time 251 for the emitter 253. In a particular aspect, the controller 160 tracks one or more detection times 224A of the emitter 104A. For example, the controller 160 can store a detection time of a first pulse that resulted in the emitter 104A transitioning into its current emitter state (e.g., the pulse that caused a transition from the undetected state 272 to the acquisition state 274) and can also store a detection time of a most recently detected pulse. For some emitter states, the priority analyzer 270 is configured to determine a corresponding periodic priority function based at least in part on the one or more detection times, as further described with reference to FIGS. 4A-4B.

During operation, the controller 160 provides a start time 280A to the priority analyzer 270 to initiate generation (or update) of a scan schedule 150. In some aspects, the controller 160 provides the start time 280A (e.g., a scan start time) to the priority analyzer 270 in response to receiving a user input, receiving a command from another device, or both. In some aspects, the mission 260 indicates a mission start time, and the controller 160 provides the mission start time as the start time 280A to the priority analyzer 270. In some aspects, the mission 260 is active until a mission end condition is satisfied. For example, the controller 160 determines that the mission 260 is no longer active in response to determining that a detected time is greater than or equal to a mission end time, that a user input indicates that mission 260 is no longer active, that the device 202 is at a particular location, that the device 202 has a particular operating state, or a combination thereof. In a particular aspect, the mission 260 indicates the mission end time, the particular location, the particular operating state, or a combination thereof.

The priority analyzer 270 determines periodic priority functions 140 associated with specific emitters, particular emitter types, or a combination thereof, that are indicated in the mission 260. For example, the priority analyzer 270, in response to determining that the mission 260 includes scanning for the emitter 104A, determines a periodic priority function 140A associated with the emitter 104A based on the emitter state 236A of the emitter 104A and the emitter signal periodicity 170A of the emitter type 282A of the emitter 104A, as further described with reference to FIGS. 4A-4B. For some values of the emitter state 236A, the periodic priority function 140A is based at least in part on the one or more detection times 224A, as further described with reference to FIGS. 4A-4B. Similarly, the priority analyzer 270, in response to determining that the mission 260 includes scanning for any emitters of the emitter type 282B, determines a periodic priority function 140B associated with the emitter type 282B based on a default emitter state (e.g., the undetected state 272) and the emitter signal periodicity 170B of the emitter type 282B.

The priority analyzer 270 determines priorities 242 for the start time 280A based on the periodic priority functions 140. For example, the priority analyzer 270 determines, based at least in part on the periodic priority function 140A, a priority 242A associated with scanning for the emitter 104A at the start time 280A, as further described with reference to FIG. 5. Similarly, the priority analyzer 270 determines, based on the periodic priority function 140B, a priority 242B associated with scanning for any emitter of the emitter type 282B at the start time 280A.

The schedule generator 290 generates (or updates) the scan schedule 150 based on the priorities 242. The scan schedule 150 includes scan slots 252 (e.g., dwells) that represent time intervals during which scanning of a corresponding frequency range 284 is performed. The scan slots 252 are selected for scanning particular frequency ranges based on the priorities 242. For example, the schedule generator 290, in response to determining that the priority 242A indicates a highest priority amongst the priorities 242 associated with the start time 280A, designates the scan slot 252A of the scan schedule 150 that has the start time 280A for scanning for the emitter 104A (e.g., by scanning the frequency range 284A of the emitter type 282A of the emitter 104A during the scan slot 252A). The schedule generator 290 updates the scan slot 252A to indicate a dwell length 286A that is based on the pulse repetition interval 220A and the pulse width 222A. For example, the dwell length 286A can correspond to a sum of the pulse repetition interval 220A and the pulse width 222A so that, if the emitter 104A is directed toward the receiver system 136 at the start time 280A, at least one complete pulse of the emitter 104A can be detected during the scan slot 252A.

The priority analyzer 270 and the schedule generator 290 iteratively determine the priorities 242 and designate scan slots of the scan schedule 150, respectively, until the scan schedule 150 is filled. For example, the schedule generator 290, in response to determining that the scan schedule 150 is not filled (e.g., a remaining portion of the scan schedule 150 has a duration greater than or equal to a minimum scan slot duration), determines a start time 280B for a next scan slot 252B based on the start time 280A and the dwell length 286A of the prior scan slot 252A. To illustrate, the start time 280B is based on a sum of the start time 280A and the dwell length 286A. The schedule generator 290 provides the start time 280B to the priority analyzer 270. The priority analyzer 270 determines priorities 242 associated with the start time 280B, and the schedule generator 290, in response to determining that the priority 242B indicates a highest priority amongst the priorities 242 associated with the start time 280B, designates the scan slot 252B for scanning the frequency range 284B of the emitter type 282B and determines the dwell length 286B of the scan slot 252B based on the pulse repetition interval 220B and the pulse width 222B.

The schedule generator 290, in response to determining that the scan schedule 150 is filled, provides the scan schedule 150 to the receiver system 136. The receiver system 136 operates in accordance with the scan schedule 150. For example, the receiver system 136, in response to determining that the scan slot 252A indicates the start time 280A, the frequency range 284A, and the dwell length 286A, uses the one or more receivers 264 to initiate scanning of the frequency range 284A at the start time 280A and continues to scan the frequency range 284A for the duration of the dwell length 286A.

If the one or more receivers 264 detect a pulse from the emitter 104A while scanning the frequency range 284A, the emitter detector 266 generates the detection notification 249 indicating that a pulse is detected at a detection time 251 (e.g., a first time) from an emitter 253 (e.g., the emitter 104A) of the emitter type 255 (e.g., the emitter type 282A). The emitter detector 266 provides the detection notification 249 to the controller 160.

The controller 160, in response to receiving the detection notification 249, updates the one or more detection times 224A for the emitter 104A in the MDF 292 to indicate that a most recently detected pulse from the emitter 104A is detected at the detection time 251 (e.g., the first time). In a particular aspect, the controller 160 also updates the SSC 226A to increment (e.g., by 1) a count of successful scans of the emitter 104A, sets the MSC 228A to indicate no unsuccessful scans, or both, in response to receiving the detection notification 249.

In another example, if the one or more receivers 264 do not detect any pulse from the emitter 104A while scanning the frequency range 284A from the start time 280A for the duration of the dwell length 286A, the emitter detector 266 generates the missed notification 239 indicating an unsuccessful scan of the emitter 104A. The emitter detector 266 provides the missed notification 239 to the controller 160, and the controller 160 may update the emitter information 263 accordingly. For example, the controller 160 can update the emitter information 263 to indicate that the missed notification 239 is received so that the MSC 228A can be incremented, after scanning corresponding to all scan slots of the scan schedule 150 is completed, if no detection notification 249 indicating the emitter 104A is received during the scan interval of the scan schedule 150.

After scanning for the emitter 104A during the scan slot 252A, the receiver system 136 continues to scan frequency ranges of any remaining scan slots of the scan schedule 150. For example, the receiver system 136, in response to determining that the scan slot 252B indicates the start time 280B, the frequency range 284B, and the dwell length 286B, uses the one or more receivers 264 to initiate scanning of the frequency range 284B at the start time 280B and continues to scan the frequency range 284B for the duration of the dwell length 286B.

If the one or more receivers 264 detect a pulse from an emitter 104B while scanning the frequency range 284B, the emitter detector 266 generates the detection notification 249 indicating that a pulse is detected at a detection time 251 (e.g., a second time) from an emitter 253 (e.g., the emitter 104B) of the emitter type 255 (e.g., the emitter type 282B). The emitter detector 266 provides the detection notification 249 to the controller 160.

In some aspects, the controller 160, in response to receiving the detection notification 249, updates the MDF 292 by adding the emitter 104B, having the emitter type 282B, into the emitter information 263. In a particular implementation, the controller 160 updates one or more detection times of the emitter 104B to include the detection time 251 (e.g., the second time), updates the SSC of the emitter 104B to indicate one successful scan, updates the MSC of the emitter 104B to indicate no unsuccessful scans, or a combination thereof. In some aspects, the controller 160 updates the emitter state of the emitter 104B based on the SSC, the MSC of the emitter 104B, and one or more thresholds, as further described with reference to FIG. 3. For example, the controller 160 sets the emitter state of the emitter 104B to the acquisition state 274 based on the SSC indicating one successful scan. In some examples, the controller 160 adds scanning for the emitter 104B to the mission 260. Alternatively, if the one or more receivers 264 do not detect any pulse while scanning the frequency range 284B during the scan slot 252B (from the start time 280B for the duration of the dwell length 286B), the emitter detector 266 generates the missed notification 239 indicating an unsuccessful scan for the emitter type 282B. The emitter detector 266 provides the missed notification 239 to the controller 160.

In some implementations, the controller 160, in response to receiving a detection notification 249, generates a detection alert indicating that the emitter 253 is detected. In some examples, the controller 160 adds the detection alert to a detection log associated with the mission 260, provides the detection alert to a display device, sends the detection alert to a user device, or a combination thereof. In some implementations, the controller 160, in response to receiving a missed notification 239 indicating an emitter 253 (or an emitter type 255), generates an unsuccessful scan alert indicating an unsuccessful scan for the emitter 253 (or the emitter type 255). In some examples, the controller 160 adds the unsuccessful scan alert to a detection log associated with the mission 260, provides the unsuccessful scan alert to a display device, sends the unsuccessful scan alert to a user device, or a combination thereof.

In some examples, the receiver system 136, in response to determining that scanning corresponding to all scan slots of the scan schedule 150 has been completed, sends a scan completion notification 247 to the controller 160. The controller 160, in response to receiving the scan completion notification 247, determines that a scan interval associated with the scan schedule 150 begins at the start time 280A of an initial scan slot (e.g., the scan slot 252A) of the scan schedule 150 and ends at a time that the scan completion notification 247 is received from the receiver system 136. The controller 160, in response to receiving at least one missed notification 239 indicating the emitter 104A and not receiving any detection notification 249 indicating the emitter 104A during the scan interval, sets the SSC 226A to indicate no successful scans, updates the MSC 228A to increment (e.g., by 1) a count of unsuccessful scans of the emitter 104A, or both. In some aspects, the controller 160 updates the emitter state 236A based on the SSC 226A, the MSC 228A, and one or more thresholds, as further described with reference to FIG. 3.

The controller 160, in response to receiving the scan completion notification 247 and determining that the mission 260 remains active, sends a predicted scan time as the start time 280A to the priority analyzer 270. In some aspects, the predicted scan time is based on a detected time (e.g., a current time) and a delay. For example, the delay corresponds to an estimated duration to generate an updated version of the scan schedule 150 and to provide the updated version of the scan schedule 150 to the receiver system 136.

The priority analyzer 270 and the schedule generator 290 generate an updated version of the scan schedule 150 for the mission 260 based on emitter states, including any updated emitter states. The controller 160 provides the updated version of the scan schedule 150 to the receiver system 136. Scanning for particular emitters, any emitters of particular emitter types, or a combination thereof, continues while the mission 260 is active.

Referring to FIG. 3, a diagram 300 illustrates an example of updating an emitter state 236 of an emitter 104, including messaging between the controller 160 and the emitter detector 266, the emitter state lifecycle 250, and the emitter information 263 for the emitter 104. The emitter state 236 is used by the priority analyzer 270 of FIG. 2 to determine a corresponding periodic priority function 140, as further described with reference to FIGS. 4A-4B.

As described previously, the emitter state lifecycle 250 indicates four emitter states: the undetected state 272, the acquisition state 274, the track state 276, and the dropped state 278. The undetected state 272 corresponds to a default state for all emitter types. In an example, the controller 160 updates the SSC 226 (e.g., increments successful scans by 1) and the MSC 228 (e.g., sets unsuccessful scans to 0) of an emitter 104 in the emitter information 263 responsive to receiving each detection notification 249 indicating the emitter 104 as the emitter 253, as described with reference to FIG. 2. In another example, the controller 160, based on not receiving any detection notification 249 indicating the emitter 104 and receiving at least one missed notification 239 indicating the emitter 104 during a scan interval of the scan schedule 150, updates the SSC 226 (e.g., sets successful scans to 0) and the MSC 228 (e.g., increments unsuccessful scans by 1) of the emitter 104, as described with reference to FIG. 2.

The controller 160, responsive to an update of the SSC 226, an update of the MSC 228, or both, evaluates whether to update an emitter state 236 of the emitter 104. For example, in response to determining that the SSC 226 is updated to indicate at least one successful scan of the emitter 104 (e.g., the SSC 226>0) while the emitter 104 is in the undetected state 272, the controller 160 updates the emitter state 236 to indicate the acquisition state 274.

In a particular aspect, the acquisition state 274 is associated with verifying whether a previous successful scan of the emitter 104 corresponds to a false detection. For example, the emitter 104 remains in the acquisition state 274 until either the SSC 226 is greater than a track threshold 331 (e.g., 2 successful scans) to confirm that the emitter 104 has been reliably detected, or until the MSC 228 is greater than a false detection threshold 333 to indicate that the previous successful scan likely corresponds to a false detection. For example, the controller 160, in response to determining that the emitter state 236 indicates the acquisition state 274 and that the MSC 228 (e.g., 1) is greater than the false detection threshold 333 (e.g., 0), updates the emitter state 236 from the acquisition state 274 to the undetected state 272. Alternatively, the controller 160, in response to determining that the emitter state 236 indicates the acquisition state 274 and determining that the SSC 226 (e.g., 2) is greater than the track threshold 331 (e.g., 1), updates the emitter state 236 from the acquisition state 274 to the track state 276.

In a particular aspect, the track state 276 is associated with the emitter 104 having been reliably detected. The emitter 104 remains in the track state 276 until the MSC 228 is greater than a drop threshold 335, which indicates that the emitter 104 can no longer be reliably detected. In a particular aspect, the controller 160, in response to determining that the emitter state 236 indicates the track state 276 and that the MSC 228 (e.g., 3) is greater than the drop threshold 335 (e.g., 2), updates the emitter state 236 from the track state 276 to the dropped state 278. To illustrate, the emitter 104 that was previously reliably detected may have moved out of range of the receiver system 136 of FIG. 1 or the scan repetition interval 174 of the emitter 104 may have shifted since the initial detection of the emitter 104.

In a particular aspect, the dropped state 278 is associated with performing modified scanning for the emitter 104 to verify whether the emitter 104 that was previously reliably detected can be reliably detected again. The emitter 104 remains in the dropped state 278 until either the SSC 226 is greater than the track threshold 331, which indicates that the emitter 104 can be reliably detected again, or until the MSC 228 is greater than an undetected threshold 337, which confirms that the emitter 104 can no longer be reliably detected. For example, the controller 160, in response to determining that the emitter state 236 indicates the dropped state 278 and that the MSC 228 (e.g., 4) is greater than the undetected threshold 337 (e.g., 3), updates the emitter state 236 from the dropped state 278 to the undetected state 272. Alternatively, the controller 160, in response to determining that the emitter state 236 indicates the dropped state 278 and that SSC 226 (e.g., 2) is greater than the track threshold 331 (e.g., 1), updates the emitter state 236 to revert from the dropped state 278 to the track state 276.

In a particular aspect, the controller 160 tracks one or more detection times 224 of the emitter 104. The one or more detection times 224 indicate a first detection time of a pulse that resulted in the emitter state 236 transitioning from a previous emitter state to a current emitter state, a second detection time of a most recently detected pulse of the emitter 104, or both. In an illustrative example, responsive to detection of a first pulse from the emitter 104 at a first detection time, the emitter state 236 transitions from the undetected state 272 to the acquisition state 274 and the first detection time is recorded. While in the acquisition state 274, a second detection time associated with the emitter 104 is recorded (or updated) responsive to a second successful scan corresponding to detection of a second pulse from the emitter 104. The second detection time may be further updated as additional successful scans are performed for the emitter 104. Thus, the one or more detection times 224 can include the first detection time of the first pulse that caused the transition from the previous emitter state to the current emitter state (e.g., the acquisition state 274), a second detection time of the most recently detected pulse from the emitter 104, or both.

In some aspects, the priority analyzer 270 generates a periodic priority function 140 based on the emitter state 236 and the one or more detection times 224 associated with the emitter state 236, as further described with reference to FIGS. 4A-4B.

Referring to FIG. 4A, a diagram 400 illustrates an example of periodic priority functions 140 that can be determined by the priority analyzer 270 and corresponding scan schedules 150. In a first example, the periodic priority functions 140 are determined by the priority analyzer 270 during the process of detecting a particular emitter 104, and the scan slots of the corresponding scan schedules 150 are designated for detecting the emitter 104. An undetected priority function 480 and associated scan schedule 150A correspond to the emitter 104 being in the undetected state 272.

In another example, the priority analyzer 270 generates a periodic priority function 140 corresponding to the undetected state 272 during the process of detecting any emitters of a particular emitter type 282. The undetected priority function 480 and associated scan schedule 150A correspond to an undetected state 272 associated with the emitter type 282, and the scan slots of the scan schedule 150A are designated for detecting any emitter of the emitter type 282. After an emitter 104 of the emitter type 282 is detected, the priority analyzer 270 determines the periodic priority functions 140 during the process of detecting the emitter 104, and the scan slots of the scan schedules 150 are designated for detecting the emitter 104.

An acquisition priority function 482 and associated scan schedule 150B correspond to the emitter 104 being in the acquisition state 274, and a track priority function 484 and associated scan schedule 150C correspond to the emitter 104 being in the track state 276, as described further below.

The diagram 400 includes examples of beam windows 460, such as a beam window 460A, a beam window 460B, and a beam window 460C, of an emitter 104. Each of the beam windows 460 has a beam window time frame 178 (e.g., 83 ms). A pulse repetition interval 220 indicates an elapsed time between leading edges of a pair of consecutive pulses of the emitter 104. A pulse width 222 indicates an elapsed time between a leading edge and a trailing edge of a single pulse. The scan repetition interval 174 (e.g., 10 secs) corresponds to an elapsed time between consecutive beam windows. For example, the scan repetition interval 174 corresponds to a difference between a first time that a first pulse (or first group of pulses) from the emitter 104 are directed toward the receiver system 136 and a second time that a second pulse (or second group of pulses) from the emitter 104 are directed toward the receiver system 136. The scan repetition interval 174A can be estimated based on a difference between a first time at which a pulse of the beam window 460A is detected and a second time at which a pulse of the beam window 460B is detected.

The priority analyzer 270 determines a periodic priority function 140 based on an emitter state 436 and the emitter signal periodicity 170. As an example, when scanning for any undetected emitters having the emitter type 282B, the emitter state 436 and the emitter signal periodicity 170 correspond to the undetected state 272 and the emitter signal periodicity 170B, respectively, for determining the periodic priority function 140B for the undetected emitters. As another example, when scanning for the particular emitter 104A, the emitter state 436 and the emitter signal periodicity 170 correspond to the emitter state 236A and the emitter signal periodicity 170A, respectively, for determining the periodic priority function 140A for the emitter 104A. For some values of the emitter state 236A, the priority analyzer 270 determines the periodic priority function 140A based on the one or more detection times 224A, as described herein.

When an emitter 104 is previously undetected, the priority analyzer 270 cannot predict when the next beam window of the emitter 104 is to start during the next scan repetition interval 174 (e.g., next 10 seconds). The priority analyzer 270, in response to determining that the emitter state 436 indicates the undetected state 272, determines the periodic priority function 140 corresponding to the undetected state 272 based on the emitter signal periodicity 170. For example, the periodic priority function 140 corresponding to the undetected state 272 has a higher priority (e.g., a priority of 1, when priority is in a range from 0 to 1) at least once for each of the beam window time frame 178 corresponding to the emitter signal periodicity 170.

The undetected (undet.) priority function 480 is an example of the periodic priority function 140 corresponding to the undetected state 272. The undetected priority function 480 includes peaks that repeat every beam window time frame 178. As an example, for the emitter 104A in the undetected state 272, the periodic priority function 140A includes peaks that repeat once for each of the beam window time frame 178A (e.g., once per 83 ms).

The scan schedule 150A is based on the undetected priority function 480 and includes scan slots (e.g., dwells, indicated by vertical bars) designated for scanning a frequency range 284 of a particular emitter 104 or emitter type 282. As explained previously, each scan slot is assigned to the particular emitter or emitter type having highest priority at the start of that scan slot. The priority of each particular emitter or emitter type is determined by the priority analyzer 270 based at least in part on a priority indicated by the periodic priority function of that emitter or emitter type for the particular start time, a base priority of the emitter type, a step function of the emitter type, or a combination thereof, as further described with reference to FIG. 6. As illustrated, the scan slots in the scan schedules 150 in FIGS. 4A-4B occur at or near the peaks of the associated priority functions for the particular emitter 104 or emitter type 282, indicating that the particular emitter 104 or emitter type 282 had the highest priority of the various scanning tasks competing for receiver resources during those scan slots, and lower priority for the other scan slots. For clarity of illustration, scan slots that are assigned to other scanning tasks are not illustrated in FIGS. 4A-4B. However, it should be understood that, although not shown in FIGS. 4A-4B, the scan schedules 150 can include scan slots that are designated for scanning frequency ranges of one or more additional emitters, one or more additional emitter types, or a combination thereof.

Scanning, based on the scan schedule 150A, the frequency range 284 at least once for each of the beam window time frame 178 increases a probability of intercepting a pulse of any emitter of the emitter type 282 whenever a beam window of the emitter occurs during the scan. For example, a pulse of the emitter 104 is detected at a time 470 during the beam window 460A. In some aspects, the pulse detected at the time 470 causes the controller 160 to update the emitter state 436 for the emitter 104 from the undetected state 272 to the acquisition state 274 and to update the one or more detection times 224 to record the time 470.

Upon updating the emitter state 436 to the acquisition state 274, the priority analyzer 270 shifts the periodic priority function 140 based on the particular time 470 that the pulse was detected. For example, the priority analyzer 270 shifts the periodic priority function 140 based on the time 470 to generate the resulting acquisition priority function 482 such that a peak of the acquisition priority function substantially coincides with the time 470.

In FIGS. 4A-4B, a portion of a periodic priority function 140 that is used to determine a scan schedule 150 is shown with a solid line, and a dashed line is used to show a remaining (e.g., unused) portion of the periodic priority function 140. For example, a portion of the undetected priority function 480 used to determine the scan schedule 150A is shown with a solid line, and a remaining portion of the undetected priority function 480 is shown with a dashed line. To illustrate, after pulse detection at the time 470 results in transitioning to the acquisition priority function 482, the portion of the undetected priority function 480 that is no longer used is shown with a dashed line.

The acquisition priority function 482 is shown as an example of the periodic priority function 140 corresponding to the acquisition state 274. The acquisition priority function 482 is shifted relative to the undetected priority function 480 and has a higher priority (e.g., a priority of 1) at least once for each of the beam window time frame 178. The higher priority for the acquisition priority function 482 is repeated for each beam window time frame 178 from the time 470. For example, a first peak, a second peak, and a third peak of the acquisition priority function 482 are at a first time (e.g., t1+f), a second time (e.g., t1+2f), and a third time (e.g., t1+3f), respectively, where t1 corresponds to the time 470 and f corresponds to the beam window time frame 178.

The scan schedule 150B is generated based on the acquisition priority function 482 and includes scan slots (e.g., dwells) that are designated for scanning the frequency range 284. The scan schedule 150B causes the frequency range 284 to be scanned at least once every beam window time frame 178 from the time 470, increasing a probability of intercepting a pulse of the emitter 104 during a subsequent beam window. For example, a pulse of the emitter 104 is detected at a time 472 during the beam window 460B. In some aspects, the pulse detected at the time 472 causes the controller 160 to update the emitter state 436 for the emitter 104 from the acquisition state 274 to the track state 276 and to update the one or more detection times 224 to include the time 472.

After entering the track state 276 responsive to detecting the pulse from the emitter 104 at the time 472, a subsequent pulse from the emitter 104 is predicted to be detectable at integer multiples of the scan repetition interval 174 (e.g., 10 seconds) from the pulse detection. The track priority function 484 is shown as an example of the periodic priority function 140 corresponding to the track state 276.

To illustrate, in a particular aspect, in response to determining that the one or more detection times 224 indicate that the track state 276 of the emitter 104 is associated with detection at the time 472 of a previous pulse (e.g., a most recent pulse, a pulse that caused the transition to the track state 276, or both) from the emitter 104, the priority analyzer 270 generates the track priority function 484 having a period that is based on the scan repetition interval 174 and having a phase that is based on the time 472. In a particular implementation, the track priority function 484 corresponds to an approximation of a tangent function. For example, the track priority function 484 can correspond to a tangent function that is horizontally scaled and offset such that its period matches the scan repetition interval 174 and coincides with at the time 472, with values rounded off at the peaks (since the tangent function is undefined at its period), and vertically scaled and offset such that its range extends from 0 to 1.

The track priority function 484 has a higher priority (e.g., a priority of 1, when priority is in a range from 0 to 1) at least once for each scan repetition interval 174 (e.g., once every 10 seconds) with the peak priority occurring during the next expected beam window (e.g., during beam window 460C). The higher priority is repeated for each scan repetition interval 174 from the time 472. For example, a first peak, a second peak (not shown), and a third peak (not shown) of the track priority function 484 are at a first time (e.g., $t_2$+s), a second time (e.g., $t_2$+2s), and a third time (e.g., $t_2$+3s), respectively, where $t_2$ corresponds to the time 472 and s corresponds to the scan repetition interval 174 (e.g., 10 seconds).

A scan schedule 150C, based on the track priority function 484, includes scan slots (e.g., dwells) that are designated for scanning the frequency range 284 of the emitter 104. Scanning the frequency range 284 based on the scan schedule 150C, during each subsequent beam window time frame 178 (e.g., 83 ms) repeated at least once per scan repetition interval 174 (e.g., 10 seconds) after the time 472, is likely to detect subsequent pulses from the emitter 104 while reducing the frequency of scanning for the emitter 104 (as compared to the scanning in the undetected state 272 according to the scan schedule 150A and the scanning in the acquisition state 274 according to the scan schedule 150B). For example, a pulse of the emitter 104 is detected at a time 474 during the beam window 460C.

Referring to FIG. 4B, a diagram 450 illustrates another example of periodic priority functions 140 and corresponding scan schedules 150. The diagram 450 is shown with examples of predicted beam windows (PBWs) 430, such as a predicted beam window 430C, a predicted beam window 430D, a predicted beam window 430E, and a predicted beam window 430F of the emitter type 282. Each of the predicted beam windows 430 has the beam window time frame 178. An elapsed time between the starting times of consecutive predicted beam windows 430 corresponds to the scan repetition interval 174. In some aspects, the predicted beam window 430C corresponds to the beam window 460C.

Pulses from the emitter 104 are predicted to be detectable at least once during each of the predicted beam windows 430. For example, a pulse is predicted to be detectable at a time 476 that is a sum of the time 474 (e.g., the detection time of a previous pulse) and the scan repetition interval 174. The track priority function 484 is therefore configured as a periodic function that has a peak priority value during each of the predicted beam windows 430 and that has a lower priority value outside of the predicted beam windows 430.

In a particular example, the receiver system 136 may not detect any pulse from the emitter 104 during a predicted beam window 430. In some aspects, pulses are not detected from the emitter 104 when the emitter 104 is no longer within range of the receiver system 136. In other aspects, the beam windows 460 (e.g., actual beam windows) can shift relative to the predicted beam windows 430. For example, the beam window 460D can shift (earlier or later) relative to the predicted beam window 430D. In some aspects, the shift occurs because of a change in a relative position of the emitter 104 and the receiver system 136, or due to change in the transmission behavior (e.g., a transmission interruption or a change of rotation speed) of the emitter 104. For example, no pulse is detected from the emitter 104 during the predicted beam window 430D because the beam window 460D (e.g., the actual beam window) has shifted to occur earlier in time than expected, and as a result the subsequent beam windows 460E and 460F also occur earlier to the corresponding predicted beam windows 430E and 430F.

In the example of FIG. 4B, in response to failure to detect the emitter 104 during the scan slot at time 476 which coincides with the predicted beam window 430D, the controller 160 updates the emitter state 236 of the emitter 104 from the track state 276 to the dropped state 278. When the emitter state 236 corresponds to the dropped state 278 with a most recently detected previous pulse from the emitter 104 detected at a particular time (e.g., the time 474) and no pulse is detected around the time 476 (e.g., the predicted time) during the predicted beam window 430D, a subsequent pulse from the emitter 104 corresponding to a shifted beam window is predicted to be detectable at a time that is shifted relative to (e.g., before or after) a next predicted time (e.g., a time 478).

In a particular aspect, the priority analyzer 270 updates the periodic priority function 140 in response to determining that the emitter state 436 (e.g., the emitter state 236 of the emitter 104) indicates the dropped state 278 and that the dropped state 278 is associated with detection at the time 474 of a previous pulse from the emitter 104. A dropped priority function 486 is shown as an example of the periodic priority function 140 corresponding to the dropped state 278.

The dropped priority function 486 reduces the priority of scanning for the emitter 104 at the previously predicted times of pulses from the emitter 104 (e.g., during the peaks of the track priority function 484) and increases the priority of scanning at times preceding and following the previously predicted times. In a particular implementation, the dropped priority function 486 corresponds to a modified sum of sinusoidal functions. For example, the dropped priority function 486 can correspond to a sum of cosine functions with one of the cosine functions having a period matching the scan repetition interval 174, and another of the cosine functions having a period matching the beam window time frame 178. To illustrate, the dropped priority function 486 can have local maxima separated by the beam window time frame 178 (e.g., 83 ms) and evenly spaced around the predicted times of pulses from the emitter 104. In another particular implementation, the dropped priority function 486 is similar to a finite Fourier series.

The dropped priority function 486 has a higher priority (e.g., a priority of 1, when priority is in a range from 0 to 1) at times that are shifted relative to the predicted time of a pulse from the emitter 104. For example, the predicted time includes the time 476 (e.g., the time 474+f), a time 478 (e.g., the time 474+2f), and so on, where f corresponds to the scan repetition interval 174. The dropped priority function 486 has a priority 492 (e.g., a high priority) corresponding to a first shift relative to (e.g., before) the time 478 and a priority 496 (e.g., a high priority) corresponding to a second shift relative to (e.g., after) the time 478. However, at the time 478, the dropped priority function 486 has a priority 494 that is lower than the priority 492 and the priority 496.

A scan schedule 150D, based on the dropped priority function 486, includes scan slots (e.g., dwells) that are designated for scanning the frequency range 284 of the emitter 104. Scanning, based on the scan schedule 150D, the frequency range 284 of the emitter 104 at times that are shifted relative to the time 478 can detect the emitter 104 if the beam windows 460 have shifted within a shift threshold of the predicted beam windows 430. For example, if the beam window 460E has shifted within a shift threshold of the predicted beam window 430E, a pulse can be detected from the emitter 104 based on selecting scan slots that are before or after the time 478 due to the higher relative priority values (e.g., the priority 492 or the priority 496) of the dropped priority function 486 that are shifted before the time 478 and after the time 478, respectively. For example, a pulse from the emitter 104 is detected at a time 477 during the beam window 460E.

In a particular aspect, if scanning based on the dropped priority function 486 fails to detect a pulse from the emitter 104 within a threshold count of scan intervals (e.g., indicated by the undetected threshold 337) from the last detected pulse, such as if a shift of the beam windows 460 relative to the predicted beam windows 430 is greater than the shift threshold associated with the dropped priority function 486, the emitter state 236 can be set to the undetected state 272, and scanning for the emitter 104 can be performed based on the undetected priority function 480, as described with reference to FIGS. 2 and 4A. If the duration of the scan repetition interval 174 has changed (instead of a shift of a start time of the scan repetition interval 174), the emitter 104 can be treated as different from the emitter type 282 in a subsequent scan. For example, while scanning in accordance with the scan schedule 150A that is based on the undetected priority function 480, the scan repetition interval 174 can be determined (e.g., updated) based on detected pulses from the emitter 104, as further described with reference to FIG. 5.

Scanning can thus be dynamically adjusted to reduce resource usage while maintaining a high likelihood of detecting specific emitters, any emitters of particular emitter types, or both, that are indicated by the mission 260. For example, scanning can be more frequent for a previously undetected emitter (e.g., based on the undetected priority function 480) and less frequent when a corresponding emitter 104 has been reliably detected (e.g., based on the track priority function 484). With limited resources, fewer scans for any frequency range enable more scanning of other frequency ranges.

Figure 5:
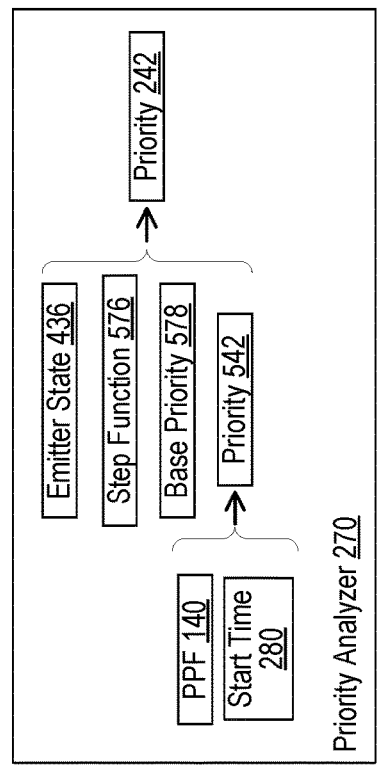
FIG. 5 is a diagram of components of the device of FIG. 2.

Referring to FIG. 5, a diagram 500 is shown of components of the device 202 of FIG. 2, according to a particular implementation. The priority analyzer 270 determines priorities 242 based on the periodic priority functions 140. For example, the priority analyzer 270 determines a priority 242 based on a value of a periodic priority function 140 at a start time 280 of a scan slot 252 of a scan schedule 150. The periodic priority function 140 for a particular emitter or emitter type can be generated by the priority analyzer 270, based on the emitter state 436, as one of an undetected priority function (e.g., the undetected priority function 480 illustrated in FIG. 4A), an acquisition priority function (e.g., the acquisition priority function 482 illustrated in FIG. 4A), a track priority function (e.g., the track priority function 484 illustrated in FIG. 4A), or a dropped priority function (e.g., the dropped priority function 486 illustrated in FIG. 4B) as the periodic priority function 140, as described with reference to FIGS. 4A-4B.

In a particular aspect, the priority analyzer 270 determines the priority 242 based on the following equation:

$$\Phi_i = p_i(x,t) * \beta_i + s_i(x), \quad \text{Equation 1}$$

where i is an index that corresponds to the emitter 104, the emitter type 282, or both, $\Phi_i$ corresponds to the priority 242, x corresponds to the emitter state 436, t corresponds to the start time 280, $p_i(x,t)$ corresponds to a priority 542 indicated by the periodic priority function 140 (corresponding to the emitter state 436) for the start time 280, $\beta_i$ corresponds to a base priority 578 of the emitter 104, the emitter type 282, or both, and $s_i(x)$ corresponds to a step function 576 to offset the priority 542, such as based on the emitter state 436.

In a particular aspect, the base priority 578 of the emitter 104, the emitter type 282, or both, corresponds to a default value, a configuration setting, a user input, or a combination thereof. In an example, the emitter type 282A and the emitter type 282B have a base priority 578A and a base priority 578B, respectively, that are indicated in the MDF 292. The base priority 578A can be the same as or distinct from the base priority 578B.

In a particular aspect, the controller 160 updates the emitter type information 261 based on detection of pulses from one or more emitters 104. For example, in response to determining that the one or more detection times 224A of an emitter 104A of the emitter type 282A do not match the scan repetition interval 174A, the controller 160 either updates the scan repetition interval 174A of the emitter type 282A, or generates an emitter type 282C that is a copy of the emitter type 282A with an updated scan repetition interval (e.g., a scan repetition interval 174C) and updates the emitter information 263 to indicate that the emitter 104A is of the emitter type 282C, as described further below.

In a particular aspect, the priority analyzer 270 determines a priority 542 corresponding to a value of the periodic priority function 140 ($p_i(x,t)$) corresponding to the emitter state 436 (x) for the start time 280 (t). The priority analyzer 270 scales the base priority 578 ($\beta_i$) by the priority 542 to determine an initial priority. The priority analyzer 270 determines a step factor ($s_i(x)$) corresponding to a value of the step function 576 based on the emitter state 436 (x). The priority analyzer 270 determines the priority 242 based on the initial priority combined with the step factor ($s_i(x)$). For example, the priority 242 corresponds to a sum of the initial priority and the step factor ($s_i(x)$).

In a particular aspect, the priority analyzer 270 uses the step function 576 to adjust (e.g., increase or decrease) the priority 242 of a particular emitter or emitter type based on a count of slots, a proportion, or both, of the scan schedule 150 already designated for scanning the frequency range 284 of that particular emitter or emitter type. In an illustrative example, a value of the step function 576 is based on the count of slots, the proportion, or both, of the scan schedule 150 that is already designated for scanning the frequency range 284. In a particular implementation, when few (e.g., a lower than threshold proportion) of the slots of the scan schedule 150 are designated for scanning frequency ranges, the step function 576 has a first value that does not change the priority 242. As some more slots of the scan schedule 150 are assigned for scanning frequency ranges, if no scan slots (or fewer than threshold scan slots) are assigned for scanning the frequency range 284, the step function 576 has a second value that increases the priority 242 to increase a likelihood of having at least the threshold scan slots assigned for scanning the frequency range 284.

In a particular aspect, the priority analyzer 270 uses the step function 576 to adjust (e.g., increase or decrease) the priority 242 based at least in part on the emitter state 436. In an example, the step function 576 indicates a weight corresponding to the emitter state 436, and the priority analyzer 270 calculates the priority 242 using the weight associated with the emitter state 436. To illustrate, the step function 576 can have one of a first weight, a second weight, a third weight, or a fourth weight corresponding to the undetected state 272, the acquisition state 274, the track state 276, and the dropped state 278, respectively.

It should be understood that the step function 576 indicating weights for four emitter states is provided as an illustrative example. In other examples, the step function 576 can indicate any number of different types of weights. In an illustrative example, the step function 576 indicates that a first weight, a second weight, a third weight, a fourth weight, a fifth weight, a sixth weight, a seventh weight, and an eighth weight correspond to the undetected state 272, the acquisition state 274, the track state 276, the dropped state 278, a missed undetected mode, a missed tracked mode, a user assigned mode, and an objective mode, respectively. In an example, the priority analyzer 270, in response to determining that the emitter state 436 indicates the acquisition state 274 and that no slots of the scan schedule 150 were designated for scanning the frequency range 284 in a most recent previous scan, updates the priority 242 by updating the step function 576 to have the fifth weight corresponding to the missed undetected mode, which can be larger than the second weight corresponding to the acquisition state 274, to increase the probability that one or more slots will be designated for scanning the frequency range 284 in a subsequent scan.

As another example, the priority analyzer 270, in response to determining that the emitter state 436 indicates the track state 276 and that no slots of the scan schedule 150 were designated for scanning the frequency range 284 in a most recent previous scan, updates the priority 242 by updating the step function 576 to have the sixth weight corresponding to the missed tracked mode, which can be larger than the third weight corresponding to the track state 276, to increase the probability that one or more slots will be designated for scanning the frequency range 284 in a subsequent scan.

In an example, the priority analyzer 270, in response to determining that a user input has indicated a particular priority for the emitter 104, the emitter type 282, or both, updates the priority 242 based on the seventh weight (e.g., the particular priority) corresponding to the user assigned mode. In another example, the priority analyzer 270, in response to determining that the mission 260 indicates a particular objective (e.g., searching, acquisition, etc.) associated with the emitter 104, the emitter type 282, or both, updates the priority 242 based on the eighth weight that corresponds to the objective mode and that is associated with the particular objective.

In a particular aspect, the step function 576 corresponds to default values, a configuration setting, a user input, or a combination thereof. In an example, the emitter type 282A and the emitter type 282B have a step function 576A and a step function 576B, respectively. The step function 576A can be the same as or distinct from the step function 576B.

In addition to determining and updating the priorities 242, as described with respect to the priority analyzer 270, FIG. 5 also illustrates that the MDF 292 can be updated based on various circumstances. For example, if some of the fields of the emitter type information 261 are not pre-populated, the controller 160 can use default values as estimates.

In a particular aspect, the controller 160 updates the emitter type information 261 (e.g., pre-populated data, estimated data, or a combination thereof) based on detection of pulses from one or more emitters 104. For example, the controller 160, in response to determining that the one or more detection times 224A do not match the scan repetition interval 174A, determines that the emitter 104A is to be associated with an updated scan repetition interval.

The controller 160 determines the updated scan repetition interval based on the one or more detection times 224A. For example, the updated scan repetition interval is based on an average of a difference between pairs of consecutive detection times. To illustrate, the updated scan repetition interval corresponds to an average based on a first difference between a first detection time and a second detection time, and a second difference between the second detection time and a third detection time.

If the mission 260 includes scanning for any emitters of the emitter type 282A or the emitter information 263 indicates multiple emitters of the emitter type 282A, the controller 160 determines that the emitter type 282A is not to be updated. The controller 160, in response to determining that the emitter 104A is to be associated with an updated scan repetition interval and that the emitter type 282A is not to be updated, generates the emitter type 282C that is a copy of the emitter type 282A and has the updated scan repetition interval as the scan repetition interval 174C, and updates the emitter information 263 to indicate that the emitter 104A is of the emitter type 282C. Alternatively, the controller 160, in response to determining that the emitter type 282A can be updated, updates the scan repetition interval 174A to indicate the updated scan repetition interval. The emitter type information 261 can thus be dynamically updated when a change in the scan repetition interval of the emitter 104A is detected.

Figure 6:
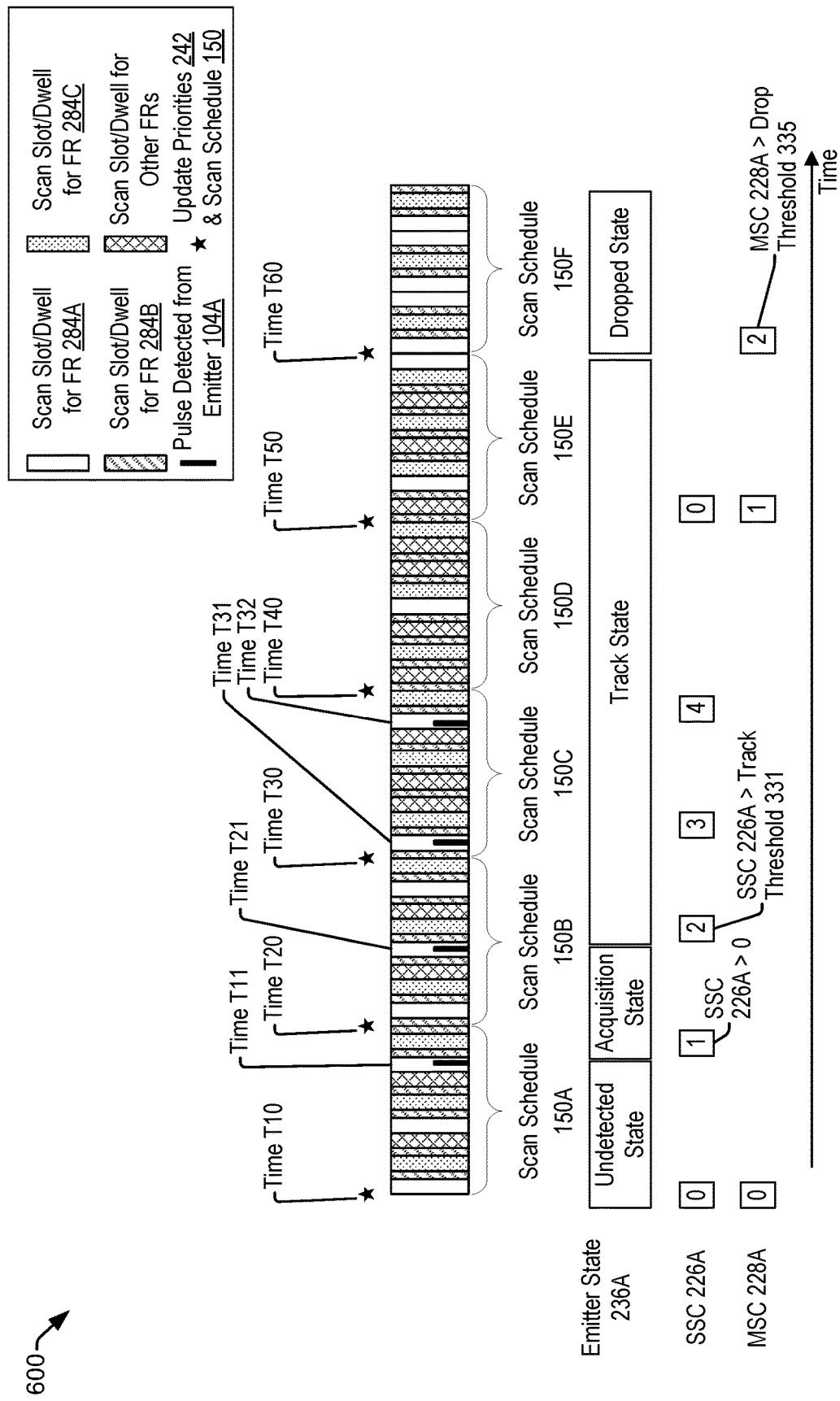
FIG. 6 is a diagram that illustrates examples of emitter detection and corresponding scan schedules generated by the system of FIG. 1.

Referring to FIG. 6, a diagram 600 is shown that illustrates examples of emitter detection and corresponding scan schedules that can be generated by the system 100 of FIG. 1. The diagram 600 depicts a scan schedule 150 for each of a series of consecutive time intervals and also values of the emitter state 236A, the SSC 226A, and the MSC 228A for the corresponding time interval. The diagram 600 provides a simplified example of a progression of emitter state changes, scan counts, and scan slot allocation as the emitter 104A is detected, tracked, and dropped.

At time T10, a scan schedule 150A is generated for a first time interval. For example, the priority analyzer 270 calculates the priority of each emitter, each emitter type, or a combination thereof, that are included in the mission 260, and the schedule generator 290 designates the initial scan slot of the scan schedule 150A for scanning the frequency range 284A as a result of having the highest priority for the initial scan slot. The priority analyzer 270 and the schedule generator 290 continue determining priorities and designating scan slots of the scan schedule 150A, respectively, until the scan schedule 150A is filled.

The scan schedule 150A includes one or more first scan slots for scanning the frequency range 284A, one or more second scan slots for scanning the frequency range 284B, one or more third scan slots for scanning a frequency range 284C, and one or more additional scan slots for scanning one or more additional frequency ranges. In a particular aspect, the first scan slots, the second scan slots, the third scan slots, and the additional scan slots are interspersed in the scan schedule 150A.

The receiver system 136 of FIG. 1 scans frequency ranges in accordance with the scan schedule 150A. While scanning the frequency range 284A during one of the first scan slots, the receiver system 136 detects, at time T11, a pulse from the emitter 104A. The controller 160, in response to detection of the pulse from the emitter 104A, increments the SSC 226A from an initial value of 0 and updates the emitter state 236A from the undetected state 272 to the acquisition state 274. In a particular aspect, the receiver system 136 continues scanning based on the scan schedule 150A even though the emitter state 236A was updated (e.g., the scan schedule 150A is not adjusted on-the-fly when the emitter 104A is detected, and instead the appropriate adjustments are introduced when generating the next scan schedule 150B).

At time T20, a scan schedule 150B is generated in a similar manner as the scan schedule 150A, using updated priority functions resulting from emitter state changes that occurred during the scan schedule 150A. For example, the priority analyzer 270 updates the periodic priority function 140A for the emitter 104A to be the acquisition priority function 482 based on the emitter state 236A changing to the acquisition state 274 due to detection of the pulse at the time T11. To illustrate, the acquisition priority function 482 is shifted relative to the undetected priority function 480 based on the time T11, as described with reference to FIG. 4A.

While scanning the frequency range 284A during one or more of the first scan slots of the scan schedule 150B, a pulse from the emitter 104A is detected at time T21. The controller 160, in response to detection of the pulse from the emitter 104A, increments the SSC 226A and compares the incremented value to the track threshold 331 (e.g., 1). The controller 160, responsive to determining that the SSC 226A is greater than the track threshold 331, updates the emitter state 236A from the acquisition state 274 to the track state 276, and continues scanning according to the scan schedule 150B.

At time T30, a scan schedule 150C is generated using updated priority functions resulting from emitter state changes that occurred during the scan schedule 150B. For example, the priority analyzer 270 updates the periodic priority function 140A for the emitter 104A to be the track priority function 484 based on the emitter state 236A changing to the track state 276 due to detection of the pulse at the time T21. To illustrate, the track priority function 484 has peaks based on the scan repetition interval 174A and the time T21, as described with reference to FIG. 4A.

Due to the emitter 104A being reliably detected and the corresponding change of the emitter state 236A to the track state 276, the scan schedule 150C includes fewer first scan slots for scanning the frequency range 284A as compared to the first scan slots included in each of the scan schedule 150A or the scan schedule 150B. While scanning the frequency range 284A during the first scan slots of the scan schedule 150C, the receiver system 136 detects, at time T31, a pulse from the emitter 104A, and detects, at time T32, another pulse from the emitter 104A. The controller 160 increments the SSC 226A responsive to detecting each of the pulses from the emitter 104A.

Similarly at time T40, the priority analyzer 270 determines priorities based on the periodic priority functions 140 and the schedule generator 290 designates scan slots of a scan schedule 150D based on the priorities, iteratively, until the scan schedule 150D is filled. The receiver system 136 of FIG. 1 scans frequency ranges in accordance with the scan schedule 150D.

At time T50, the controller 160, in response to determining that no pulse is detected during any of the first scan slots of the scan schedule 150D for scanning the frequency range 284A, updates the MSC 228A indicating a count of unsuccessful scans (e.g., 1 unsuccessful scan) for the frequency range 284A and sets the SSC 226A to a value (e.g., 0) indicating no successful scans. The controller 160, in response to determining that the MSC 228A (e.g., 1 unsuccessful scan) fails to satisfy (e.g., is less than or equal to) a drop threshold 335 (e.g., 1 unsuccessful scan), refrains from updating the emitter state 236A. Also at time T50, the priority analyzer 270 determines priorities based on the periodic priority functions 140 and the schedule generator 290 designates scan slots of a scan schedule 150E based on the priorities, iteratively, until the scan schedule 150E is filled. The receiver system 136 of FIG. 1 scans frequency ranges in accordance with the scan schedule 150E.

At time T60, the controller 160, in response to determining that no pulse is detected during any of the first scan slots of the scan schedule 150E for scanning the frequency range 284A, increments (e.g., by 1) the MSC 228A. The controller 160, in response to determining that the MSC 228A (e.g., 2 unsuccessful scans) satisfies (e.g., is greater than) the drop threshold 335 (e.g., 1 unsuccessful scan), updates the emitter state 236A from the track state 276 to the dropped state 278.

Also at time T60, the priority analyzer 270 updates the periodic priority function 140A to be the dropped priority function 486 based on the emitter state 236A changing to the dropped state 278. For example, the dropped priority function 486 can be generated based on the emitter signal periodicity 170A and the time T32 when the most recent peak was detected. To illustrate, the dropped priority function 486 has peaks based on the scan repetition interval 174A and the time T32, as described with reference to FIG. 4B.

The priority analyzer 270 determines priorities based on the periodic priority functions 140 and the schedule generator 290 designates scan slots of a scan schedule 150F based on the priorities, iteratively, until the scan schedule 150F is filled. The receiver system 136 scans frequency ranges in accordance with the scan schedule 150F. The scan schedule 150F has more first scan slots for scanning the frequency range 284A as compared to the first scan slots included in the scan schedule 150E due to the change in the emitter state 236A to the dropped state 278.

The controller 160 thus updates the scan schedule 150 based on a prior iteration of operating the receiver system 136. For example, the controller 160 updates the emitter state 236A, the periodic priority function 140A, or both, based on a first iteration of operating the receiver system 136 according to the scan schedule 150. The priority analyzer 270 updates the priority 242A responsive to the update of the emitter state 236A, the periodic priority function 140A, or both. The priority analyzer 270, based at least in part on the update of the priority 242A, updates the scan schedule 150 for a subsequent iteration of operating the receiver system 136. In some aspects, the controller 160 continues to update the scan schedule 150 and the receiver system 136 continues to scan frequencies based on the scan schedule 150 until an end of the mission 260.

Although particular values for thresholds (e.g., 1 unsuccessful scan for the drop threshold 335) are provided as illustrative examples, it should be understood that the thresholds can have various values based on default data, user input, configuration data, or a combination thereof.

Figure 7:
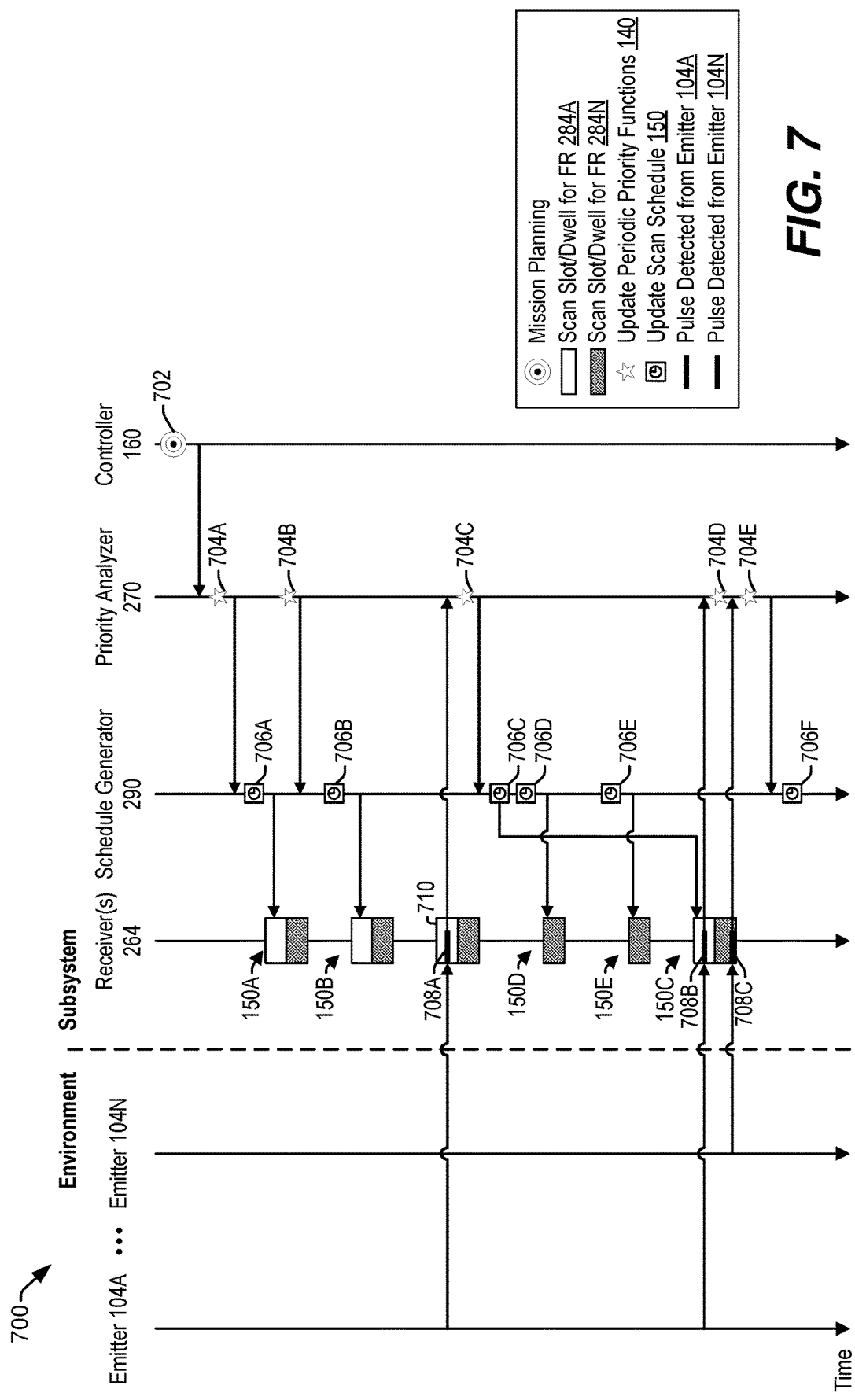
FIG. 7 is a ladder diagram that illustrates an example of emitter detection and corresponding scan schedules generated by the system of FIG. 1.

Referring to FIG. 7, a ladder diagram 700 is shown that illustrates an example of emitter detection and corresponding scan schedules generated by the system 100 of FIG. 1.

At 702, mission planning is performed. For example, the controller 160 receives the MDF 292 indicating a mission 260 that includes scanning the frequency range 284A of the emitter 104A and any emitters of a frequency range 284N. The controller 160 updates the emitter information 263 to set the emitter state 236A of the emitter 104A to the undetected state 272, as described with reference to FIG. 2.

At 704A, the priority analyzer 270 determines the periodic priority functions 140 based on the emitter states 436 and the emitter signal periodicities 170, as described with reference to FIGS. 2, 4A, and 4B. For example, the priority analyzer 270 determines that the periodic priority function 140A for the emitter 104A is the undetected priority function 480 based on the emitter state 236A being the undetected state 272 and based on the emitter signal periodicity 170A.

At 706A, the schedule generator 290 generates a scan schedule 150A based on priorities corresponding to the periodic priority functions 140, as described with reference to FIG. 2. For example, the scan schedule 150A includes a first scan slot for scanning the frequency range 284A and a second scan slot for scanning the frequency range 284N. The one or more receivers 264 perform scanning in accordance with the scan schedule 150A and no pulse is detected from the emitter 104A or any emitter of the frequency range 284N.

At 704B, the priority analyzer 270 determines the periodic priority functions 140 based on the emitter states 436 and the emitter signal periodicities 170. For example, the priority analyzer 270 determines the periodic priority function 140A remains the undetected priority function 480 based on the emitter state 236A remaining the undetected state 272.

At 706B, the schedule generator 290 generates a scan schedule 150B based on priorities corresponding to the periodic priority functions 140. For example, the scan schedule 150A includes a first scan slot for scanning the frequency range 284A and a second scan slot for scanning the frequency range 284N. The one or more receivers 264 perform scanning in accordance with the scan schedule 150B.

At 708A, the one or more receivers 264 detect, at a first time, a pulse from the emitter 104A while scanning the frequency range 284A during a scan slot 710 of the scan schedule 150B. The receiver system 136 provides a detection notification 249 to the controller 160. The detection notification 249 indicates that a pulse is detected at a detection time 251 (e.g., the first time) from an emitter 253 (e.g., the emitter 104A) of an emitter type 255 (e.g., the emitter type 282A), as described with reference to FIG. 2. In a particular implementation, the controller 160, in response to receiving the detection notification 249, updates the SSC 226A to indicate 1 successful scan, updates the MSC 228A to indicate no unsuccessful scans, and updates the one or more detection times 224A to indicate the first time as a detection time of a most recently received pulse from the emitter 104A.

In a particular aspect, the controller 160, based on determining that the SSC 226A is greater than or equal to a track threshold 331 (e.g., 1 successful scan), updates the emitter state 236A from the undetected state 272 to the track state 276 and updates the one or more detection times 224A to indicate that the first time also corresponds to the detection time that caused the transition from the undetected state 272 to the track state 276. (In this illustrative example in which the track threshold 331 corresponds to one successful scan, the emitter state lifecycle 250 includes a transition from the undetected state 272 to the track state 276, bypassing the acquisition state 274.)

At 704C, the priority analyzer 270 determines the periodic priority functions 140 based on the emitter states 436 and the emitter signal periodicities 170. For example, the priority analyzer 270 determines the periodic priority function 140A is the track priority function 484 based on the emitter state 236A being the track state 276 and based on the emitter signal periodicity 170A.

At 706C, the schedule generator 290 generates a scan schedule 150C based on priorities corresponding to the periodic priority functions 140. For example, the schedule generator 290 generates the scan schedule 150C to include a first scan slot for scanning the frequency range 284A and a second scan slot for scanning the frequency range 284N. In a particular aspect, the scan schedule 150C, based on the periodic priority function 140A being the track priority function 484, includes a first scan slot with a start time (e.g., the first time+10 secs) that corresponds to a sum of the detection time (e.g., the first time) and the scan repetition interval 174A (e.g., 10 secs). The receiver system 136 of FIG. 1 schedules scanning in accordance with the scan schedule 150C at the start time.

At 706D, the schedule generator 290 generates a scan schedule 150D based on priorities corresponding to the periodic priority functions 140. In a particular aspect, the periodic priority function 140A indicates relatively low priority for any time earlier than the sum of the detection time (e.g., the first time) and the scan repetition interval 174A (e.g., 10 secs), As a result, the scan schedule 150D does not include any first scan slots for scanning the frequency range 284A but does include a second scan slot for scanning the frequency range 284N. The one or more receivers 264 perform scanning in accordance with the scan schedule 150D, and no pulse is detected from any emitter of the frequency range 284N.

At 706E, the schedule generator 290 generates a scan schedule 150E based on priorities corresponding to the periodic priority functions 140. The scan schedule 150E includes a second scan slot for scanning the frequency range 284N but does not include any first scan slots for scanning the frequency range 284A because the track priority function 484 associated with the emitter 104A indicates relatively low priority for the scan slots of the scan schedule 150E. The one or more receivers 264 perform scanning in accordance with the scan schedule 150E, and no pulse is detected from any emitter of the frequency range 284N.

The one or more receivers 264 perform scanning in accordance with the scan schedule 150C at the start time (e.g., the first time+10 secs) of the scan schedule 150C. At 708B, the one or more receivers 264 detect, at a second time, a pulse from the emitter 104A while scanning the frequency range 284A during a first scan slot of the scan schedule 150C. The receiver system 136 provides a detection notification 249 to the controller 160, indicating that a pulse is detected at a detection time 251 (e.g., the second time) from an emitter 253 (e.g., the emitter 104A) of an emitter type 255 (e.g., the emitter type 282A). In a particular implementation, the controller 160, in response to receiving the detection notification 249, increments the SSC 226A and updates the one or more detection times 224A to indicate the second time as a detection time of a most recently received pulse from the emitter 104A.

At 704D, the priority analyzer 270 determines the periodic priority functions 140 based on the emitter states 436 and the emitter signal periodicities 170. For example, the priority analyzer 270 determines that the periodic priority function 140A remains the track priority function 484 based on the emitter state 236A remaining the track state 276.

At 708C, the one or more receivers 264 detect a pulse from the emitter 104N while scanning the frequency range 284N during a second scan slot of the scan schedule 150C. The receiver system 136 provides a detection notification 249 to the controller 160, indicating that a pulse is detected at a detection time 251 (e.g., a third time) from an emitter 253 (e.g., an emitter 104N) of an emitter type 255 (e.g., an emitter type associated with the frequency range 284N). In a particular implementation, the controller 160, in response to receiving the detection notification 249, updates the emitter information 263 to indicate the emitter 104N of the emitter type associated with the frequency range 284N. The controller 160 updates the emitter information 263 to indicate that the emitter 104N has a SSC 226 indicating one successful scan, a MSC 228 indicating no unsuccessful scans, or both. The controller 160 also updates one or more detection times 224 of the emitter 104N in the emitter information 263 to indicate that the third time corresponds to a most recently received pulse from the emitter 104N. In a particular aspect, the controller 160 updates an emitter state 236 of the emitter 104N from the undetected state 272 to the track state 276 and updates the one or more detection times 224 to indicate that the third time also corresponds to a detection time of a pulse that caused a transition from the undetected state 272 to the track state 276.

At 704E, the priority analyzer 270 determines the periodic priority functions 140 based on the emitter states 436 and the emitter signal periodicities 170. For example, the priority analyzer 270 determines that a periodic priority function 140 of the emitter 104N is the track priority function 484 based on the emitter state 236 of the emitter 104N being the track state 276 and the emitter signal periodicity 170 of the emitter 104N. At 706F, the schedule generator 290 generates a scan schedule based on priorities corresponding to the periodic priority functions 140.

The diagram 700 thus illustrates that, after detecting a pulse from the emitter 104A at the first time and transitioning the emitter state 236A of the emitter 104A to the track state 276, the first scan slots for scanning the frequency range 284A can be spaced further apart. The resources of the receiver system 136 can be used to scan other frequency ranges while maintaining a high likelihood of detecting a next pulse from the emitter 104A (e.g., during a first scan slot of the scan schedule 150C).

Figure 8:
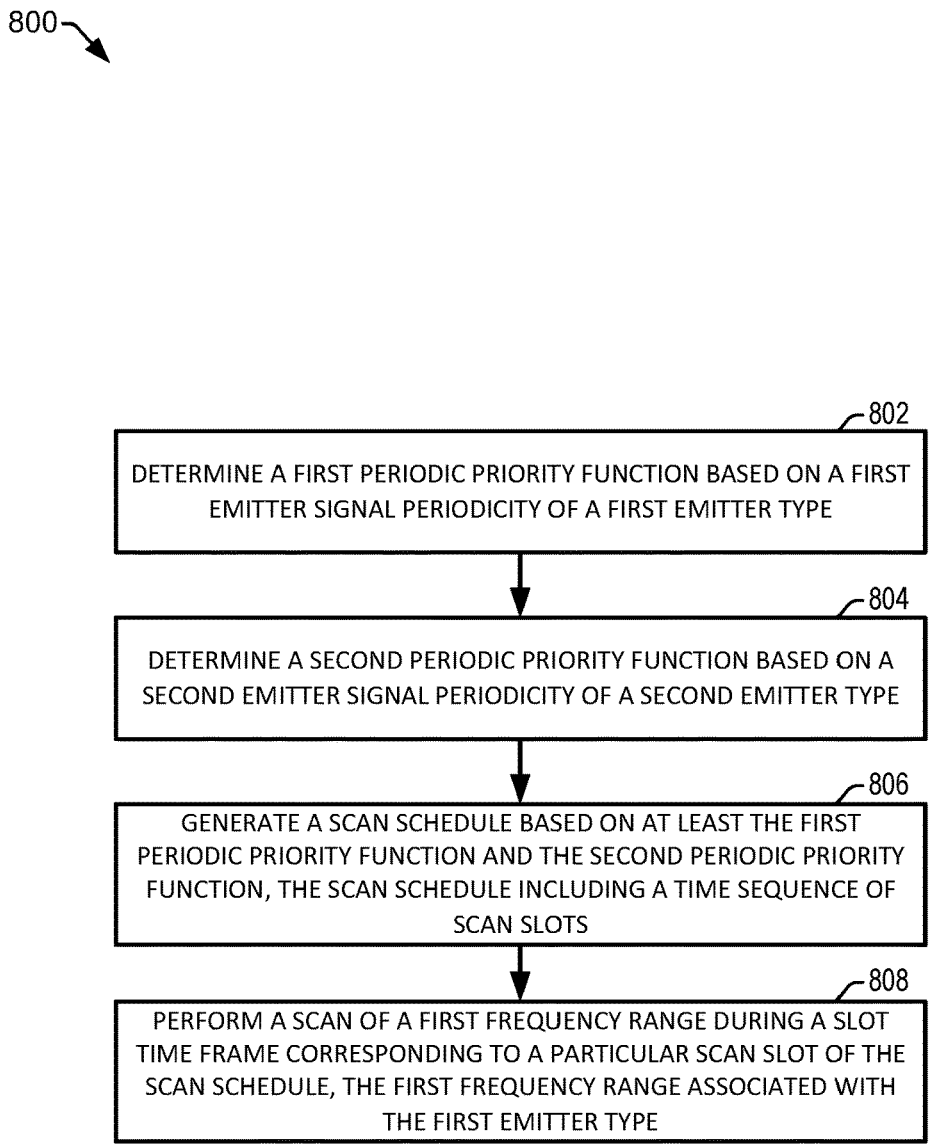
FIG. 8 is a diagram that illustrates a flow chart of an example of method of generating a periodic priority based scan schedule.

Referring to FIG. 8, a particular implementation of a method 800 of generating a periodic priority based scan schedule is shown. In a particular aspect, one or more operations of the method 800 are performed by at least one of the controller 160, the receiver system 136, the aircraft 102, the system 100 of FIG. 1, the priority analyzer 270, the schedule generator 290, the one or more processors 230, the one or more receivers 264, or the device 202 of FIG. 2.

The method 800 includes determining a first periodic priority function based on a first emitter signal periodicity of a first emitter type, at 802. For example, the priority analyzer 270 determines the periodic priority function 140A based on the emitter signal periodicity 170A of the emitter type 282A, as described with reference to FIGS. 2, 4A, and 4B.

The method 800 also includes determining a second periodic priority function based on a second emitter signal periodicity of a second emitter type, at 804. For example, the priority analyzer 270 determines the periodic priority function 140B based on the emitter signal periodicity 170B of the emitter type 282B, as described with reference to FIGS. 2, 4A, and 4B.

The method 800 further includes generating a scan schedule based on at least the first periodic priority function and the second periodic priority function, the scan schedule including a time sequence of scan slots, at 806. For example, the schedule generator 290 generates the scan schedule 150 based at least on the periodic priority function 140A and the periodic priority function 140B, as described with reference to FIG. 2. The scan schedule 150 includes a time sequence of scan slots, such as the scan slot 252A, the scan slot 252B, one or more additional scan slots, or a combination thereof.

The method 800 also includes performing a scan of a first frequency range during a slot time frame corresponding to a particular scan slot of the scan schedule, the first frequency range associated with the first emitter type, at 808. For example, the receiver system 136 performs a scan of the frequency range 284A during a slot time frame corresponding to the scan slot 252A of the scan schedule 150, as described with reference to FIG. 2. The frequency range 284A is associated with the emitter type 282A.

The method 800 thus enables determining periodic priority functions of frequency ranges based on corresponding emitter signal periodicities. The emitter signal periodicities correspond to likelihood of detectability of emitters that transmit using the respective frequency ranges. The scan schedule 150 is generated based on the periodic priority functions such that frequency ranges are assigned to scan slots based at least in part on a likelihood of detectability of corresponding emitters. Fewer scans can be performed of a particular frequency range while maintaining a high likelihood of detecting pulses from corresponding emitters. With limited resources, fewer scans for any frequency range enable more scanning of other frequency ranges.

Figure 9:
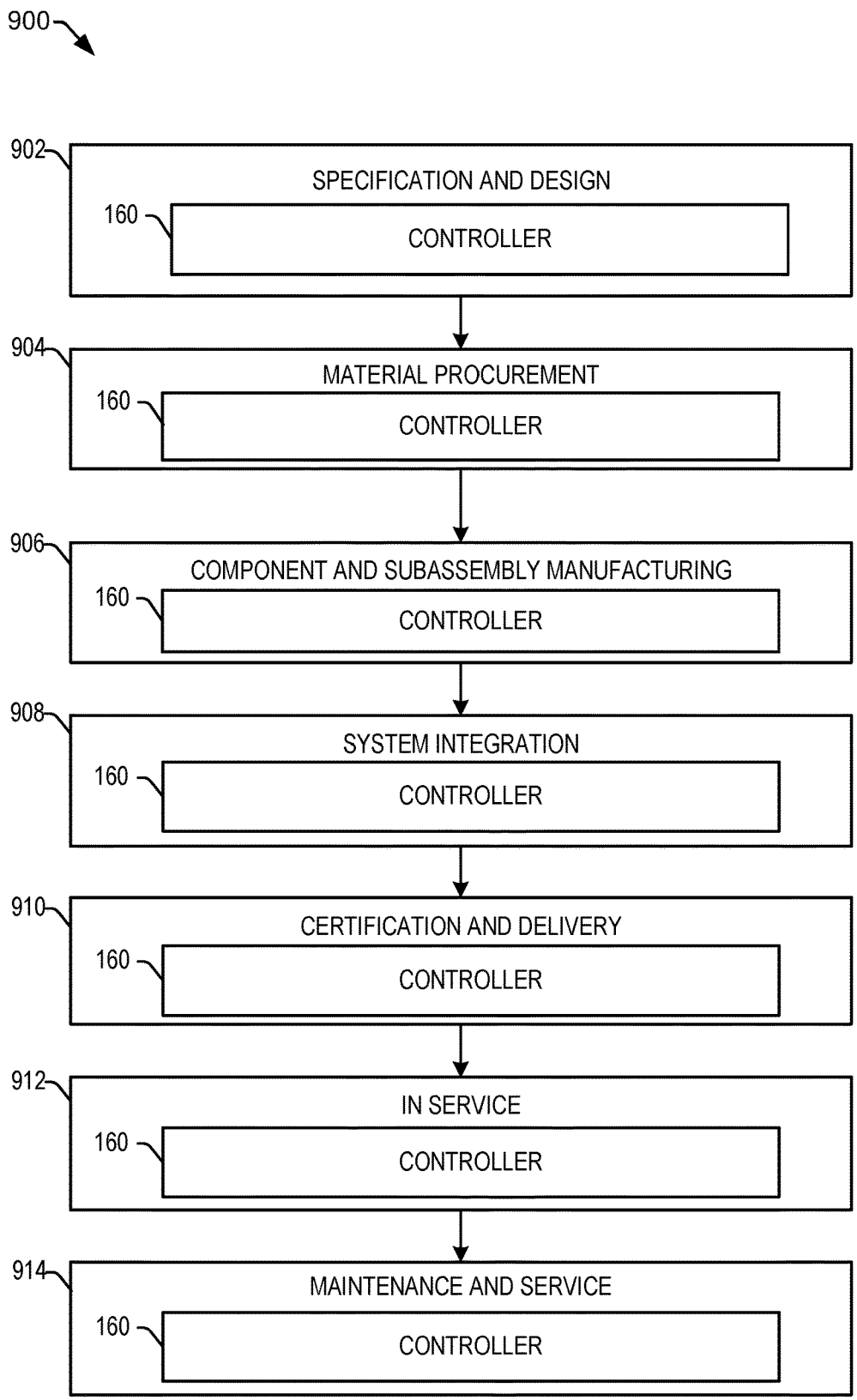
FIG. 9 is a flowchart illustrating a life cycle of an aircraft of the system of FIG. 1.

Referring to FIG. 9, a flowchart illustrative of a life cycle of an aircraft that includes the controller 160 is shown and designated 900. During pre-production, the exemplary method 900 includes, at 902, specification and design of an aircraft, such as the aircraft 102 of FIG. 1. During specification and design of the aircraft, the method 900 may include specification and design of the controller 160. At 904, the method 900 includes material procurement, which may include procuring materials for the controller 160.

During production, the method 900 includes, at 906, component and subassembly manufacturing and, at 908, system integration of the aircraft. For example, the method 900 may include component and subassembly manufacturing of the controller 160 and system integration of the controller 160. At 910, the method 900 includes certification and delivery of the aircraft and, at 912, placing the aircraft in service. Certification and delivery may include certification of the controller 160 to place the controller 160 in service. While in service by a customer, the aircraft may be scheduled for routine maintenance and service (which may also include modification, reconfiguration, refurbishment, and so on). At 914, the method 900 includes performing maintenance and service on the aircraft, which may include performing maintenance and service on the controller 160.

Each of the processes of the method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is the aircraft 102 as shown in FIG. 10.

Figure 10:
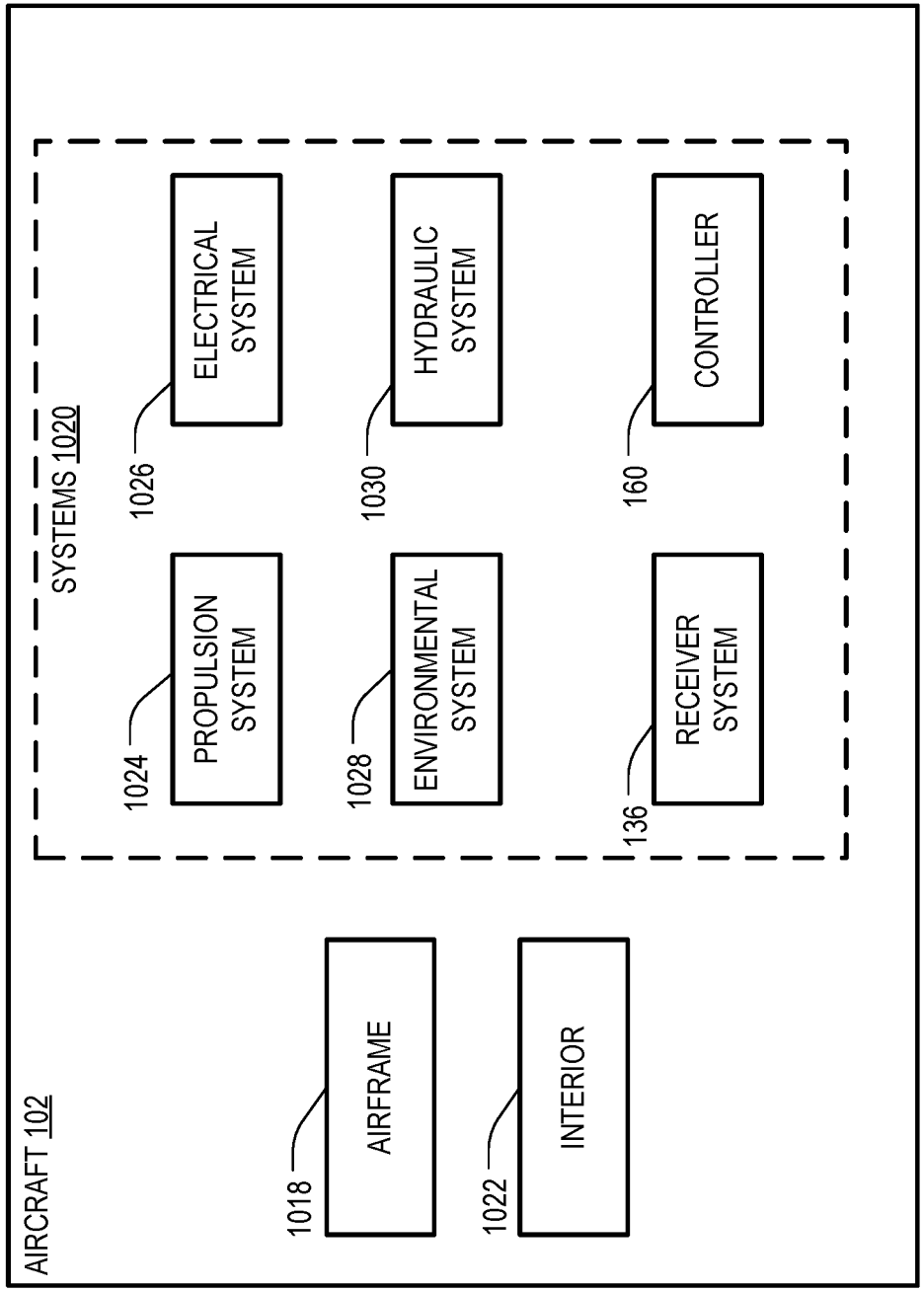
FIG. 10 is a block diagram of a particular implementation of the aircraft of the system of FIG. 1.

In the example of FIG. 10, the aircraft 102 includes an airframe 1018 with a plurality of systems 1020 and an interior 1022. Examples of the plurality of systems 1020 include one or more of a propulsion system 1024, an electrical system 1026, an environmental system 1028, a hydraulic system 1030, the receiver system 136, and the controller 160. Any number of other systems may be included.

Figure 11:
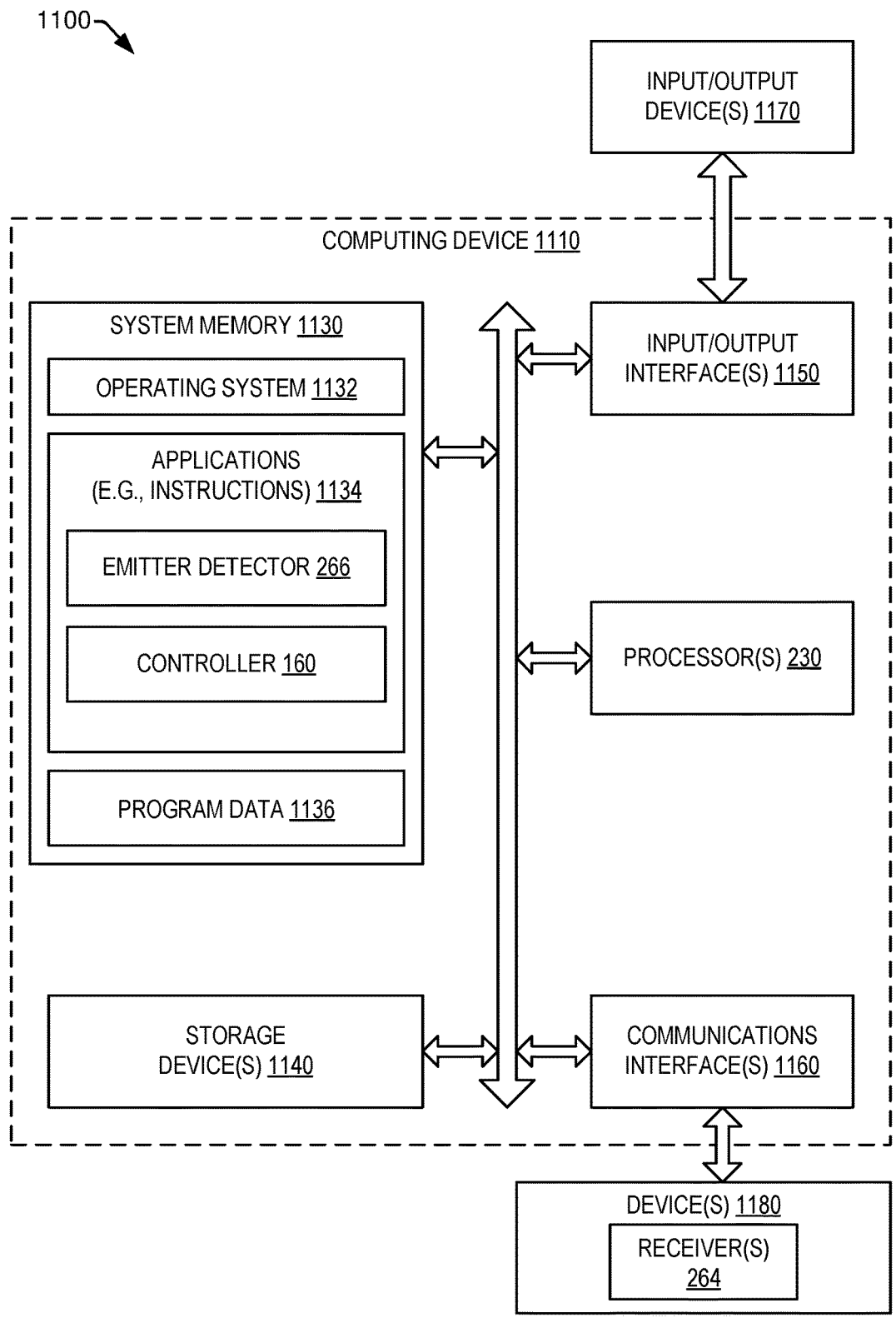
FIG. 11 is a block diagram of a computing environment including a computing device configured to support aspects of computer-implemented methods and computer-executable program instructions (or code) according to the present disclosure.

FIG. 11 is a block diagram of a computing environment 1100 including a computing device 1110 configured to support aspects of computer-implemented methods and computer-executable program instructions (or code) according to the present disclosure. For example, the computing device 1110, or portions thereof, is configured to execute instructions to initiate, perform, or control one or more operations described with reference to FIGS. 1-10.

The computing device 1110 includes the one or more processors 230. The one or more processors 230 are configured to communicate with system memory 1130, one or more storage devices 1140, one or more input/output interfaces 1150, one or more communications interfaces 1160, or any combination thereof. The system memory 1130 includes volatile memory devices (e.g., random access memory (RAM) devices), nonvolatile memory devices (e.g., read-only memory (ROM) devices, programmable read-only memory, and flash memory), or both. The system memory 1130 stores an operating system 1132, which may include a basic input/output system for booting the computing device 1110 as well as a full operating system to enable the computing device 1110 to interact with users, other programs, and other devices. The system memory 1130 stores system (program) data 1136, such as indicating the scan schedule 150, the periodic priority functions 140 of FIG. 1, the pulse repetition interval 220, the pulse width 222, the priorities 242, the emitter type information 261, the emitter information 263, the MDF 292, the detection time 251, the emitter 253, the emitter type 255 of FIG. 2, the track threshold 331, the false detection threshold 333, the drop threshold 335, the undetected threshold 337 of FIG. 3, the emitter state 436, the time 470, the time 472, the time 474, the undetected priority function 480, the acquisition priority function 482, the track priority function 484 of FIG. 4A, the predicted beam windows 430, the dropped priority function 486, the time 476, the time 477, the time 478 of FIG. 4B, the step function 576, the base priority 578, the priority 542 of FIG. 5, or a combination thereof. In a particular aspect, the system memory 1130 corresponds to the memory 232 of FIG. 2.

The system memory 1130 includes one or more applications 1134 (e.g., sets of instructions) executable by the one or more processors 230. As an example, the one or more applications 1134 include instructions executable by the one or more processors 230 to initiate, control, or perform one or more operations described with reference to FIGS. 1-10. To illustrate, the one or more applications 1134 include instructions executable by the one or more processors 230 to initiate, control, or perform one or more operations described with reference to the controller 160, the emitter detector 266, or both.

In a particular implementation, the system memory 1130 includes a non-transitory, computer readable medium storing the instructions that, when executed by the one or more processors 230, cause the one or more processors 230 to initiate, perform, or control operations to generate a scan schedule for emitter detection. The operations include determining a first periodic priority function (e.g., the periodic priority function 140A) based on a first emitter signal periodicity (e.g., the emitter signal periodicity 170A) of a first emitter type (e.g., the emitter type 282A) and determining a second periodic priority function (e.g., the periodic priority function 140B) based on a second emitter signal periodicity (e.g., the emitter signal periodicity 170B) of a second emitter type (e.g., the emitter type 282B). The operations also include generating a scan schedule (e.g., the scan schedule 150) based on at least the first periodic priority function and the second periodic priority function. The scan schedule includes a time sequence of scan slots. The operations further include initiating a scan of a first frequency range (e.g., the frequency range 284A) during a particular scan slot (e.g., the scan slot 252A) of the scan schedule. The first frequency range is associated with the first emitter type.

The one or more storage devices 1140 include nonvolatile storage devices, such as magnetic disks, optical disks, or flash memory devices. In a particular example, the storage devices 1140 include both removable and non-removable memory devices. The storage devices 1140 are configured to store an operating system, images of operating systems, applications (e.g., one or more of the applications 1134), and program data (e.g., the program data 1136). In a particular aspect, the system memory 1130, the storage devices 1140, or both, include tangible computer-readable media. In a particular aspect, one or more of the storage devices 1140 are external to the computing device 1110.

The one or more input/output interfaces 1150 enable the computing device 1110 to communicate with one or more input/output devices 1170 to facilitate user interaction. For example, the one or more input/output interfaces 1150 can include a display interface, an input interface, or both. For example, the input/output interface 1150 is adapted to receive input from a user, to receive input from another computing device, or a combination thereof. In some implementations, the input/output interface 1150 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1170 includes one or more user interface devices and displays, including some combination of buttons, keyboards, pointing devices, displays, speakers, microphones, touch screens, and other devices.

The one or more processors 230 are configured to communicate with devices or controllers 1180 via the one or more communications interfaces 1160. For example, the one or more communications interfaces 1160 can include a network interface. The devices or controllers 1180 can include, for example, the one or more receivers 264, one or more other devices, or any combination thereof. In a particular implementation, the one or more receivers 264 are integrated in the computing device 1110 and communicate with (e.g., receive transmitted signals) the one or more emitters 104 of FIG. 1 via the one or more communications interfaces 1160.

In conjunction with the described systems and methods, an apparatus for generating a scan schedule for emitter detection is disclosed that includes means for determining a first periodic priority function based on a first emitter signal periodicity of a first emitter type. In some implementations, the means for determining the first periodic priority function corresponds to the controller 160, the aircraft 102, the system 100 of FIG. 1, the priority analyzer 270, the one or more processors 230, the device 202 of FIG. 2, the plurality of systems 1020 of FIG. 10, the computing device 1110, one or more other circuits or devices configured to determine the first periodic priority function, or a combination thereof.

The apparatus also includes means for determining a second periodic priority function based on a second emitter signal periodicity of a second emitter type. In some implementations, the means for determining the second periodic priority function corresponds to the controller 160, the aircraft 102, the system 100 of FIG. 1, the priority analyzer 270, the one or more processors 230, the device 202 of FIG. 2, the plurality of systems 1020 of FIG. 10, the computing device 1110, one or more other circuits or devices configured to determine the second periodic priority function, or a combination thereof.

The apparatus further includes means for generating a scan schedule based on at least the first periodic priority function and the second periodic priority function, the scan schedule including a time sequence of scan slots. In some implementations, the means for generating the scan schedule corresponds to the controller 160, the aircraft 102, the system 100 of FIG. 1, the schedule generator 290, the one or more processors 230, the device 202 of FIG. 2, the plurality of systems 1020 of FIG. 10, the computing device 1110, one or more other circuits or devices configured to generate the scan schedule, or a combination thereof.

The apparatus also includes means for performing a scan of a first frequency range during a slot time frame corresponding to a particular scan slot of the scan schedule, the first frequency range associated with the first emitter type. In some implementations, the means for performing the scan corresponds to the controller 160, the receiver system 136, the aircraft 102, the system 100 of FIG. 1, the one or more receivers 264, the emitter detector 266, the one or more processors 230, the device 202 of FIG. 2, the plurality of systems 1020 of FIG. 10, the computing device 1110, one or more other circuits or devices configured to perform the scan, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-11. In some implementations, part or all of one or more of the operations or methods of FIGS. 1-11 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, a device includes: a controller configured to: determine a first periodic priority function based on a first emitter signal periodicity of a first emitter type; determine a second periodic priority function based on a second emitter signal periodicity of a second emitter type; and generate a scan schedule of a receiver system based on at least the first periodic priority function and the second periodic priority function.

Example 2 includes the device of Example 1, further including the receiver system coupled to the controller and configured to operate in accordance with the scan schedule.

Example 3 includes the device of Example 1 or Example 2, wherein the controller is configured to determine the first emitter signal periodicity based on a beamwidth of the first emitter type, a scan repetition interval of the first emitter type, or both.

Example 4 includes the device of Example 3, wherein the receiver system is configured to perform, based on the scan schedule, a scan of a first frequency range at least once during each beam window time frame of the first emitter type and repeated at least once per scan repetition interval of the first emitter type, and wherein the first frequency range is associated with the first emitter type.

Example 5 includes the device of any of Example 1 to Example 4, wherein the scan schedule includes a time sequence of scan slots, and wherein the controller is configured to, for a particular scan slot of the scan schedule: determine a first priority based at least in part on a slot start time of the particular scan slot, a first emitter state, the first periodic priority function, a first base priority of the first emitter type, or a combination thereof; determine a second priority based at least in part on the slot start time, a second emitter state, the second periodic priority function, a second base priority of the second emitter type, or a combination thereof; and assign the particular scan slot to the first emitter type based at least in part on the first priority and the second priority.

Example 6 includes the device of Example 5, wherein the controller is configured to: scale the first base priority by a value of the first periodic priority function, for the first emitter state at the slot start time, to determine an initial priority; determine a step factor corresponding to the first emitter state; and determine the first priority based on the initial priority combined with the step factor.

Example 7 includes the device of Example 5 or Example 6, wherein the first emitter state is one of an undetected state, an acquisition state, a track state, or a dropped state.

Example 8 includes the device of any of Example 5 to Example 7, wherein the controller is configured to, in response to determining that the first emitter state corresponds to an undetected state, determine the first periodic priority function based on the first emitter signal periodicity that is indicated by a beamwidth and a scan repetition interval of the first emitter type.

Example 9 includes the device of any of Example 5 to Example 8, wherein the controller is configured to: based on a first iteration of operating the receiver system according to the scan schedule, update the first emitter state, the first periodic priority function, or both; update the first priority responsive to the update of the first emitter state, the first periodic priority function, or both; and based at least in part on the update of the first priority, update the scan schedule of the receiver system for a subsequent iteration of operating the receiver system.

Example 10 includes the device of any of Example 5 to Example 9, further including the receiver system coupled to the controller and configured to perform a first scan, during the particular scan slot, of a first frequency range associated with the first emitter type.

Example 11 includes the device of Example 10, wherein the controller is configured to, in response to determining that the first emitter state corresponds to an undetected state and that the receiver system detected a first pulse of a first emitter of the first emitter type at a first detection time during the first scan, update the first emitter state to an acquisition state and update the first periodic priority function based on the first detection time.

Example 12 includes the device of Example 10 or Example 11, wherein the controller is configured to, in response to determining that the first emitter state corresponds to an acquisition state associated with detection of a previous pulse of a first emitter of the first emitter type during a previous scan and that the receiver system detected a first pulse of the first emitter at a first detection time during the first scan, update the first emitter state to a track state and update the first periodic priority function based on the first detection time and the first emitter signal periodicity that is indicated by a scan repetition interval of the first emitter type.

Example 13 includes the device of any of Example 10 to Example 12, wherein the controller is configured to: in response to determining that the first emitter state corresponds to an acquisition state associated with detection of a previous pulse of a first emitter of the first emitter type during a previous scan and that the receiver system has not detected any pulse of the first emitter during the first scan, update a count of scans during which the first emitter is undetected; and in response to determining that the count of scans is greater than a false detection threshold, update the first emitter state to an undetected state.

Example 14 includes the device of any of Example 10 to Example 13, wherein the controller is configured to: in response to determining that the first emitter state corresponds to a track state associated with detection of a previous pulse of a first emitter of the first emitter type at a previous detection time during a previous scan and that the receiver system did not detect any pulse of the first emitter during the first scan, update a count of scans during which the first emitter is undetected; and in response to determining that the count of scans is greater than a drop threshold, update the first emitter state to a dropped state and update the first periodic priority function based on the previous detection time and the first emitter signal periodicity.

Example 15 includes the device of any of Example 10 to Example 14, wherein the controller is configured to, in response to determining that the first emitter state corresponds to a dropped state associated with detection of a previous pulse of a first emitter of the first emitter type during a previous scan, and that the receiver system detected a first pulse of the first emitter at a first detection time during the first scan, update the first emitter state to a track state and update the first periodic priority function based on the first detection time and the first emitter signal periodicity that is indicated by a beamwidth and a scan repetition interval of the first emitter type.

Example 16 includes the device of any of Example 10 to Example 15, wherein the controller is configured to: in response to determining that the first emitter state corresponds to a dropped state, that the first emitter state is associated with detection of a previous pulse of a first emitter of the first emitter type during a previous scan, and that the receiver system did not detect any pulse of the first emitter during the first scan, update a count of scans during which the first emitter is undetected; and in response to determining that the count of scans is greater than an undetectable threshold, update the first emitter state to an undetected state and update the first periodic priority function based on the first emitter signal periodicity that is indicated by a beamwidth and a scan repetition interval of the first emitter type.

Example 17 includes the device of any of Example 1 to Example 16, wherein the controller and the receiver system is integrated in an aircraft.

Example 18 includes the device of any of Example 1 to Example 17, wherein the controller is further configured to determine a first dwell length based on a first pulse repetition interval and a first pulse width of the first emitter type, and wherein a duration of the particular scan slot corresponds to the first dwell length.

According to Example 19, a method includes: determining, at a device, a first periodic priority function based on a first emitter signal periodicity of a first emitter type; determining, at the device, a second periodic priority function based on a second emitter signal periodicity of a second emitter type; generating, at the device, a scan schedule based on at least the first periodic priority function and the second periodic priority function, the scan schedule including a time sequence of scan slots; and performing, at the device, a scan of a first frequency range during a particular scan slot of the scan schedule, the first frequency range associated with the first emitter type.

Example 20 includes the method of Example 19, further including determining the first emitter signal periodicity based on a beamwidth of the first emitter type, a scan repetition interval of the first emitter type, or both.

Example 21 includes the method of Example 20, further including performing, based on the scan schedule, a scan of a first frequency range at least once during each beam window time frame of the first emitter type and repeated at least once per scan repetition interval of the first emitter type, wherein the first frequency range is associated with the first emitter type.

Example 22 includes the method of any of Example 19 to Example 21, wherein the scan schedule includes a time sequence of scan slots, and the method further including, for a particular scan slot of the scan schedule: determining a first priority based at least in part on a slot start time of the particular scan slot, a first emitter state, the first periodic priority function, a first base priority of the first emitter type, or a combination thereof; determining a second priority based at least in part on the slot start time, a second emitter state, the second periodic priority function, a second base priority of the second emitter type, or a combination thereof; and assigning the particular scan slot to the first emitter type based at least in part on the first priority and the second priority.

Example 23 includes the method of Example 22, further including: scaling the first base priority by a value of the first periodic priority function, for the first emitter state at the slot start time, to determine an initial priority; determining a step factor corresponding to the first emitter state; and determining the first priority based on the initial priority combined with the step factor.

Example 24 includes the method of Example 22 or Example 23, wherein the first emitter state is one of an undetected state, an acquisition state, a track state, or a dropped state.

Example 25 includes the method of any of Example 22 to Example 24, further including, in response to determining that the first emitter state corresponds to an undetected state, determining the first periodic priority function based on the first emitter signal periodicity that is indicated by a beamwidth and a scan repetition interval of the first emitter type.

Example 26 includes the method of any of Example 22 to Example 25, further including: based on a first iteration of scanning according to the scan schedule, updating the first emitter state, the first periodic priority function, or both; updating the first priority responsive to the update of the first emitter state, the first periodic priority function, or both; and based at least in part on the update of the first priority, updating the scan schedule of the receiver system for a subsequent iteration of scanning.

Example 27 includes the method of any of Example 22 to Example 26, further including performing a first scan, during the particular scan slot, of a first frequency range associated with the first emitter type.

Example 28 includes the method of Example 27, further including, in response to determining that the first emitter state corresponds to an undetected state and that the receiver system detected a first pulse of a first emitter of the first emitter type at a first detection time during the first scan, updating the first emitter state to an acquisition state and updating the first periodic priority function based on the first detection time.

Example 29 includes the method of Example 27 or Example 28, further including, in response to determining that the first emitter state corresponds to an acquisition state associated with detection of a previous pulse of a first emitter of the first emitter type during a previous scan and detecting a first pulse of the first emitter at a first detection time during the first scan, updating the first emitter state to a track state and updating the first periodic priority function based on the first detection time and the first emitter signal periodicity that is indicated by a scan repetition interval of the first emitter type.

Example 30 includes the method of any of Example 27 to Example 29, further including: in response to determining that the first emitter state corresponds to an acquisition state associated with detection of a previous pulse of a first emitter of the first emitter type during a previous scan and that no pulse of the first emitter is detected during the first scan, updating a count of scans during which the first emitter is undetected; and in response to determining that the count of scans is greater than a false detection threshold, updating the first emitter state to an undetected state.

Example 31 includes the method of any of Example 27 to Example 30, further including: in response to determining that the first emitter state corresponds to a track state associated with detection of a previous pulse of a first emitter of the first emitter type at a previous detection time during a previous scan and that no pulse of the first emitter is detected during the first scan, updating a count of scans during which the first emitter is undetected; and in response to determining that the count of scans is greater than a drop threshold, updating the first emitter state to a dropped state and updating the first periodic priority function based on the previous detection time and the first emitter signal periodicity.

Example 32 includes the method of any of Example 27 to Example 31, further including, in response to determining that the first emitter state corresponds to a dropped state associated with detection of a previous pulse of a first emitter of the first emitter type during a previous scan, and detecting a first pulse of the first emitter at a first detection time during the first scan, updating the first emitter state to a track state and updating the first periodic priority function based on the first detection time and the first emitter signal periodicity that is indicated by a beamwidth and a scan repetition interval of the first emitter type.

Example 33 includes the method of any of Example 27 to Example 32, further including: in response to determining that the first emitter state corresponds to a dropped state, that the first emitter state is associated with detection of a previous pulse of a first emitter of the first emitter type during a previous scan, and that no pulse of the first emitter is detected during the first scan, updating a count of scans during which the first emitter is undetected; and in response to determining that the count of scans is greater than an undetectable threshold, updating the first emitter state to an undetected state and updating the first periodic priority function based on the first emitter signal periodicity that is indicated by a beamwidth and a scan repetition interval of the first emitter type.

Example 35 includes the method of any of Example 19 to Example 34, further including determining a first dwell length based on a first pulse repetition interval and a first pulse width of the first emitter type, wherein a duration of the particular scan slot corresponds to the first dwell length.

According to Example 36, a device includes: a memory configured to store instructions; and a processor configured to execute the instructions to perform the method of any of Example 19 to 35.

According to Example 37, a non-transitory computer-readable medium stores instructions that, when executed by a processor, cause the processor to perform the method of any of Example 19 to Example 35.

According to Example 38, an apparatus includes means for carrying out the method of any of Example 19 to Example 35.

According to Example 39, a non-transitory computer-readable medium stores instructions that, when executed by one or more processors, cause the one or more processors to: determine a first periodic priority function based on a first emitter signal periodicity of a first emitter type; determine a second periodic priority function based on a second emitter signal periodicity of a second emitter type; generate a scan schedule based on at least the first periodic priority function and the second periodic priority function, the scan schedule including a time sequence of scan slots; and initiate a scan of a first frequency range during a particular scan slot of the scan schedule, the first frequency range associated with the first emitter type.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
a controller configured to:
determine a first periodic priority function based on a first emitter signal periodicity of a first emitter type;
determine a second periodic priority function based on a second emitter signal periodicity of a second emitter type; and
generate a scan schedule of a receiver system based on at least the first periodic priority function and the second periodic priority function, wherein the scan schedule includes a time sequence of scan slots; and
for a particular scan slot of the scan schedule:
determine a first priority based at least in part on a slot start time of the particular scan slot, a first emitter state, the first periodic priority function, a first base priority of the first emitter type, or a combination thereof;
determine a second priority based at least in part on the slot start time, a second emitter state, the second periodic priority function, a second base priority of the second emitter type, or a combination thereof; and
assign the particular scan slot to the first emitter type based at least in part on the first priority and the second priority.

2. The device of claim 1, further comprising the receiver system coupled to the controller and configured to operate in accordance with the scan schedule.

3. The device of claim 1, wherein the controller is configured to determine the first emitter signal periodicity based on a beamwidth of the first emitter type, a scan repetition interval of the first emitter type, or both.

4. The device of claim 3, wherein the receiver system is configured to perform, based on the scan schedule, a scan of a first frequency range at least once during each beam window time frame of the first emitter type and repeated at least once per scan repetition interval of the first emitter type, and wherein the first frequency range is associated with the first emitter type.

5. The device of claim 1, wherein the one or more processors are configured to assign the particular scan slot to the first emitter type responsive to the first priority being higher than the second priority.

6. The device of claim 1, wherein the controller is configured to:
scale the first base priority by a value of the first periodic priority function, for the first emitter state at the slot start time, to determine an initial priority;
determine a step factor corresponding to the first emitter state; and
determine the first priority based on the initial priority combined with the step factor.

7. The device of claim 1, wherein the first emitter state is one of an undetected state, an acquisition state, a track state, or a dropped state.

8. The device of claim 1, wherein the controller is configured to, in response to determining that the first emitter state corresponds to an undetected state, determine the first periodic priority function based on the first emitter signal periodicity that is indicated by a beamwidth and a scan repetition interval of the first emitter type.

9. The device of claim 1, wherein the controller is configured to:
based on a first iteration of operating the receiver system according to the scan schedule, update the first emitter state, the first periodic priority function, or both;
update the first priority responsive to the update of the first emitter state, the first periodic priority function, or both; and
based at least in part on the update of the first priority, update the scan schedule of the receiver system for a subsequent iteration of operating the receiver system.

10. The device of claim 1, further comprising the receiver system coupled to the controller and configured to perform a first scan, during the particular scan slot, of a first frequency range associated with the first emitter type.

11. The device of claim 10, wherein the controller is configured to, in response to determining that the first emitter state corresponds to an undetected state and that the receiver system detected a first pulse of a first emitter of the first emitter type at a first detection time during the first scan, update the first emitter state to an acquisition state and update the first periodic priority function based on the first detection time.

12. The device of claim 10, wherein the controller is configured to, in response to determining that the first emitter state corresponds to an acquisition state associated with detection of a previous pulse of a first emitter of the first emitter type during a previous scan and that the receiver system detected a first pulse of the first emitter at a first detection time during the first scan, update the first emitter state to a track state and update the first periodic priority function based on the first detection time and the first emitter signal periodicity that is indicated by a scan repetition interval of the first emitter type.

13. The device of claim 10, wherein the controller is configured to:
in response to determining that the first emitter state corresponds to an acquisition state associated with detection of a previous pulse of a first emitter of the first emitter type during a previous scan and that the receiver system has not detected any pulse of the first emitter during the first scan, update a count of scans during which the first emitter is undetected; and
in response to determining that the count of scans is greater than a false detection threshold, update the first emitter state to an undetected state.

14. The device of claim 10, wherein the controller is configured to:
in response to determining that the first emitter state corresponds to a track state associated with detection of a previous pulse of a first emitter of the first emitter type at a previous detection time during a previous scan and that the receiver system did not detect any pulse of the first emitter during the first scan, update a count of scans during which the first emitter is undetected; and
in response to determining that the count of scans is greater than a drop threshold, update the first emitter state to a dropped state and update the first periodic priority function based on the previous detection time and the first emitter signal periodicity.

15. The device of claim 10, wherein the controller is configured to, in response to determining that the first emitter state corresponds to a dropped state associated with detection of a previous pulse of a first emitter of the first emitter type during a previous scan, and that the receiver system detected a first pulse of the first emitter at a first detection time during the first scan, update the first emitter state to a track state and update the first periodic priority function based on the first detection time and the first emitter signal periodicity that is indicated by a beamwidth and a scan repetition interval of the first emitter type.

16. The device of claim 10, wherein the controller is configured to:
in response to determining that the first emitter state corresponds to a dropped state, that the first emitter state is associated with detection of a previous pulse of a first emitter of the first emitter type during a previous scan, and that the receiver system did not detect any pulse of the first emitter during the first scan, update a count of scans during which the first emitter is undetected; and
in response to determining that the count of scans is greater than an undetectable threshold, update the first emitter state to an undetected state and update the first periodic priority function based on the first emitter signal periodicity that is indicated by a beamwidth and a scan repetition interval of the first emitter type.

17. The device of claim 1, wherein the controller and the receiver system is integrated in an aircraft.

18. A method comprising:
determining, at a device, a first periodic priority function based on a first emitter signal periodicity of a first emitter type;
determining, at the device, a second periodic priority function based on a second emitter signal periodicity of a second emitter type;
generating, at the device, a scan schedule based on at least the first periodic priority function and the second periodic priority function, the scan schedule including a time sequence of scan slots, wherein the scan schedule includes a time sequence of scan slots;
for a particular scan slot of the scan schedule:
determining a first priority based at least in part on a slot start time of the particular scan slot, a first emitter state, the first periodic priority function, a first base priority of the first emitter type, or a combination thereof;

determining a second priority based at least in part on the slot start time, a second emitter state, the second periodic priority function, a second base priority of the second emitter type, or a combination thereof; and assigning the particular scan slot to the first emitter type based at least in part on the first priority and the second priority; and performing, at the device, a scan of a first frequency range during the particular scan slot, the first frequency range associated with the first emitter type.

19. The method of claim 18, further comprising determining a first dwell length based on a first pulse repetition interval and a first pulse width of the first emitter type, and wherein a duration of the particular scan slot corresponds to the first dwell length.

20. A non-transitory computer-readable medium storing instructions that, when executed by one or more processors, cause the one or more processors to:

determine a first periodic priority function based on a first emitter signal periodicity of a first emitter type;

determine a second periodic priority function based on a second emitter signal periodicity of a second emitter type;

generate a scan schedule based on at least the first periodic priority function and the second periodic priority function, the scan schedule including a time sequence of scan slots, wherein the scan schedule includes a time sequence of scan slots;

for a particular scan slot of the scan schedule:

determine a first priority based at least in part on a slot start time of the particular scan slot, a first emitter state, the first periodic priority function, a first base priority of the first emitter type, or a combination thereof;

determine a second priority based at least in part on the slot start time, a second emitter state, the second periodic priority function, a second base priority of the second emitter type, or a combination thereof; and assign the particular scan slot to the first emitter type based at least in part on the first priority and the second priority; and initiate a scan of a first frequency range during the particular scan slot, the first frequency range associated with the first emitter type.

\* \* \* \* \*